US012607302B2

(12) United States Patent
Cheng et al.

(10) Patent No.: US 12,607,302 B2
(45) Date of Patent: Apr. 21, 2026

(54) HIGH-PRESSURE GAS FILLING/UNLOADING SYSTEM

(71) Applicants: CHINA PETROLEUM & CHEMICAL CORPORATION, Beijing (CN); SINOPEC RESEARCH INSTITUTE OF SAFETY ENGINEERING CO., LTD., Qingdao (CN)

(72) Inventors: Longjun Cheng, Qingdao (CN); Zhe Yang, Qingdao (CN); Bin Tao, Qingdao (CN); Jianzhong Zhang, Qingdao (CN); Zhenzhong Wang, Qingdao (CN); Wenqing Zhao, Qingdao (CN); Lili Ding, Qingdao (CN); Juan Liu, Qingdao (CN); Liangliang Li, Qingdao (CN)

(73) Assignees: CHINA PETROLEUM & CHEMICAL CORPORATION, Beijing (CN); SINOPEC RESEARCH INSTITUTE OF SAFETY ENGINEERING CO., LTD., Qingdao (CN)

( * ) Notice: Subject to any disclaimer, the term of this patent is extended or adjusted under 35 U.S.C. 154(b) by 0 days.

(21) Appl. No.: 18/722,378

(22) PCT Filed: Dec. 20, 2022

(86) PCT No.: PCT/CN2022/140271

§ 371 (c)(1),
(2) Date: Jun. 20, 2024

(87) PCT Pub. No.: WO2023/116665

PCT Pub. Date: Jun. 29, 2023

(65) Prior Publication Data

US 2025/0327550 A1 Oct. 23, 2025

(30) Foreign Application Priority Data

Dec. 21, 2021 (CN) ......................... 202111572969.2
Jul. 20, 2022 (CN) ......................... 202210857508.8

(51) Int. Cl.
*F17C 5/06* (2006.01)
*F17C 7/00* (2006.01)

(52) U.S. Cl.
CPC .................. *F17C 5/06* (2013.01); *F17C 7/00* (2013.01); *F17C 2205/0326* (2013.01);
(Continued)

(58) Field of Classification Search
CPC ...... F17C 5/06; F17C 7/00; F17C 2205/0326; F17C 2205/0352; F17C 2205/037;
(Continued)

(56) References Cited

U.S. PATENT DOCUMENTS 2,701,146 A * 2/1955 Warren .................. F16L 39/04 285/190
4,998,560 A * 3/1991 Le Devehat ......... B67D 7/3218 137/616
(Continued)

FOREIGN PATENT DOCUMENTS

CN 101830422 A 9/2010
CN 101830422 B * 11/2012
(Continued)

OTHER PUBLICATIONS

KR-20170000967-U English Translation of Specification (Year: 2025).*
(Continued)

*Primary Examiner* — Timothy L Maust
*Assistant Examiner* — Stephanie A Shrieves
(74) *Attorney, Agent, or Firm* — NKL Law; Allen Xue

(57) ABSTRACT

A high-pressure gas filling and unloading system has a high-pressure gas pipeline for connecting to a gas filling
(Continued)

station, a displacement gas pipeline for gas displacement, a plurality of double-channel rotating joints provided in said high-pressure gas pipeline and configured to be rotatable under pressure, and a filling and unloading joint provided at a free end of said high-pressure gas pipeline and comprising a control mechanism. The filling and unloading joint is configured to form a displacement working channel or a filling and unloading working channel therein through the control mechanism. The control mechanism is configured to alternately open the displacement working channel and the filling and unloading working channel, so that the displacement working channel is in communication with the displacement gas pipeline for gas displacement, or the filling and unloading working channel is in communication with the high-pressure gas pipeline for filling and unloading of high-pressure gas.

18 Claims, 9 Drawing Sheets

(52) U.S. Cl.
CPC ................. *F17C 2205/0352* (2013.01); *F17C 2205/037* (2013.01); *F17C 2221/012* (2013.01); *F17C 2221/017* (2013.01); *F17C 2221/033* (2013.01); *F17C 2223/035* (2013.01); *F17C 2225/035* (2013.01)

(58) Field of Classification Search
CPC .......... F17C 2221/012; F17C 2221/017; F17C 2221/033; F17C 2223/035; F17C 2225/035
USPC .......................................................... 141/284
See application file for complete search history.

(56) References Cited

U.S. PATENT DOCUMENTS

| | | | | |
|---|---|---|---|---|
| 6,408,880 | B1 * | 6/2002 | Kaul | F16L 37/23 137/614.05 |
| 7,669,612 | B2 * | 3/2010 | Matsumoto | F16L 37/44 137/271 |
| 8,186,649 | B2 * | 5/2012 | Aoki | F16L 37/0848 251/149.6 |
| 8,590,568 | B2 * | 11/2013 | Tiberghien | F16L 37/36 137/614 |
| 10,919,756 | B2 * | 2/2021 | Vega Perez | F17C 13/082 |
| 2005/0161097 | A1 | 7/2005 | Weh et al. | |
| 2005/0205141 | A1 * | 9/2005 | Weh | F16L 37/121 137/614.06 |
| 2018/0208275 | A1 | 7/2018 | Unno et al. | |
| 2021/0197683 | A1 * | 7/2021 | Graham | B25J 15/0019 |

FOREIGN PATENT DOCUMENTS

| | | | | | |
|---|---|---|---|---|---|
| CN | 103867890 | A | | 6/2014 | |
| CN | 205136894 | U | | 4/2016 | |
| CN | 108758139 | A | | 11/2018 | |
| CN | 109340411 | A | | 2/2019 | |
| CN | 109386679 | A | | 2/2019 | |
| CN | 208779122 | U | | 4/2019 | |
| CN | 110206950 | A | | 9/2019 | |
| CN | 110748731 | A | | 2/2020 | |
| CN | 110953415 | A | | 4/2020 | |
| CN | 210637646 | U | | 5/2020 | |
| CN | 111577934 | A | | 8/2020 | |
| CN | 111664354 | A | * | 9/2020 | F17C 13/02 |
| CN | 113251315 | A | | 8/2021 | |
| CN | 213982138 | U | | 8/2021 | |
| DE | 19516029 | C1 | | 10/1996 | |
| JP | 2019002544 | A | | 1/2019 | |
| KR | 20170000967 | U | * | 3/2017 | F17C 5/06 |

OTHER PUBLICATIONS

CN-111664354-A English Translation of Specification (Year: 2025).*
CN-101830422-B English Translation of Specification (Year: 2025).*

* cited by examiner

HIGH-PRESSURE GAS FILLING/UNLOADING SYSTEM

CROSS REFERENCE OF RELATED APPLICATIONS

This application is a U.S. national stage entry of PCT International Application No. PCT/CN2022/140271, filed on Dec. 20, 2022, which claims the priorities of Chinese patent application No. 202111572969.2 entitled "QUICK CONNECTOR FOR HYDROGEN TUBE BUNDLE VEHICLE" and filed on Dec. 21, 2021, and Chinese patent application No. 202210857508.8 entitled "DOUBLE-CHANNEL HIGH-PRESSURE HYDROGEN ROTATING JOINT, LOADING AND UNLOADING ARM, AND HYDROGEN LOADING AND UNLOADING SYSTEM" and filed on Jul. 20, 2022, the content of each is incorporated herein by reference in its entirety.

TECHNICAL FIELD

The present invention relates to the technical field of gaseous fuel filling or unloading apparatus, and specifically to a high-pressure gas filling and unloading system.

TECHNICAL BACKGROUND

Recent years have witnessed a surge in the demand for high-pressure gases such as hydrogen and CNG (compressed natural gas) as new types of clean energy, due to the rapid progress in new energy industry. In particular, more and more hydrogen filling stations are being constructed both at home and abroad as exemplary operation and commercialization of hydrogen fuel cell vehicles have been advancing steadily.

However, there still remain problems of low gas-supply efficiency, improper safety risk prevention and control measures, and unsound safety specification systems in existing gas filling stations. For hydrogen filling station, for example, hydrogen is a colorless, odorless, flammable and explosive gas characterized by small density, large diffusion coefficient, low ignition temperature, wide combustion and explosion range, fast flame speed, etc. Moreover, hydrogen molecules are small and can easily penetrate metals and organic matters, resulting in leakage. Therefore, safety issues concerning hydrogen leakage and explosion are vitally important in the application of hydrogen energy. Since large quantities of high-pressure gases are stored in the filling station, large-scale flammable gas cloud can be easily formed once the leakage occurs, which may also lead to violent explosion, posing a serious threat to the safety and property of people. Gases are supplied to the filling station basically through road transportation of tube bundle vehicle, and the filling and unloading of high-pressure gas in the filling station take a long time. Therefore, the connection between tanker truck and filling and unloading pipeline determines the safety of the entire filling and unloading operations.

At present, hoses and threaded joints are usually used in the high-pressure tube bundle vehicle for filling and unloading hydrogen, CNG, etc. After the threaded joint is connected, it is necessary to test the leakage with soapy water. Once the problem such as bubbling occurs, it is necessary to tighten the connection and then test the leakage again. After the connection is tested to be qualified, the filling pipeline should be purged so that the air inside the pipeline can be replaced with nitrogen. The air content needs to meet a certain standard before the filling and unloading operations can be carried out. However, the above method of filling and unloading still has some defects. For example, coexistence of air and hydrogen may occur when displacement gas volume is large, and high-speed hydrogen jet may lead to combustion and explosion accidents. The filling pressure of hydrogen tube bundle vehicle is 20 MPa, which will be increased to 45 MPa. Once hydrogen leakage is detected during the filling and unloading of high-pressure hydrogen, the operation needs to be halted in order to check the leakage point at the connection. After the connection is fixed and the leakage is tested to be zero, the filling and unloading operation can be continued. The security of the connection components for the filling and unloading operation of high-pressure gas ensures the safety of the overall filling and unloading area. However, the conventional connection through threaded-joint hose is cumbersome to operate, and the high-pressure gas hose and the threaded joint are connected with each other by buckling, which are prone to pull off. As a result, high-pressure gas may leak from the connection area, leading to inefficient connection and poor sealing reliability of the connection. Furthermore, the high-pressure gas hose and the threaded joint can't be automatically sealed after decoupling, and the pull-off valve can't be pulled off, leading to high-pressure gas jet at a high speed and flinging of metal hose. The resultant friction sparks are very likely to cause combustion and explosion. Hence, the hose in the filling and unloading of high-pressure gas poses a major safety hazard, and there is an urgent need to address safety concerns of the filling and unloading of high-pressure gases by tube bundle vehicle. For operations of filling and unloading high-pressure gas via low-density and high-pressure transportation, a new type of high-pressure gas filling and unloading system is urgently needed.

SUMMARY OF THE INVENTION

In view of the above technical problems, the present invention aims to propose a high-pressure gas filling and unloading system, which enables hard-tube connection between a high-pressure gas filling and unloading column and a high-pressure gas tube bundle vehicle through double-channel rotating joints, filling and unloading arms, and a filling and unloading joint. With reliable connections, double-channel circulation for high-pressure gas and displacement gas, high-pressure gas safety relief and displacement and other functions, the system is able to effectively ensure the safety of filling and unloading operations of high-pressure gas tube bundle vehicle, and significantly improve the reliability of the overall connection for filling and unloading of high-pressure gas.

Aiming at solving the above technical problems, the present invention aims to propose a high-pressure gas filling and unloading system, which comprises a high-pressure gas pipeline for connecting to a gas filling station, a displacement gas pipeline for gas displacement, a plurality of double-channel rotating joints provided in said high-pressure gas pipeline and configured to be rotatable under pressure, and a filling and unloading joint provided at a free end of said high-pressure gas pipeline and comprising a control mechanism, said filling and unloading joint being configured to form a displacement working channel or a filling and unloading working channel therein through the control mechanism. The control mechanism is configured to alternately open the displacement working channel and the filling and unloading working channel, so that the displacement working channel is in communication with the displacement gas pipeline for gas displacement, or the filling and unloading working channel is in communication with the high-pressure gas pipeline for filling and unloading of high-pressure gas.

In one embodiment, the high-pressure gas has a pressure ranged from 10 to 50 MPa, and the high-pressure gas is preferably hydrogen, CNG or helium.

In one embodiment, the filling and unloading joint further comprises a male end unit for connection with a high-pressure gas transportation vehicle or a gas-fueled device, and a female end unit for fixed connection with the high-pressure gas pipeline, the control mechanism being arranged on the female end unit.

In one embodiment, the female end unit comprises a female housing, a valve core assembly within the female housing, and a bypass displacement pipeline formed within the female housing, wherein an inner cavity of the female end unit is able to be in communication with the bypass displacement pipeline to form a female displacement flow path. The valve core assembly is configured to move, driven by the control mechanism, axially relative to the female housing, thereby closing the female displacement flow path and forming a female filling and unloading flow path within the female end unit.

In one embodiment, the control mechanism is configured to drive the valve core assembly to move axially, so that a male pilot flow path in the male end unit and the female displacement flow path are alternately in communication with the inner cavity of the female end unit for gas displacement, and the female filling and unloading flow path is in communication with a male filling and unloading flow path in the male end unit to open the filling and unloading working channel for filling and unloading of high-pressure gas.

In one embodiment, the control mechanism comprises a handle gear provided on the female housing and a transmission gear which engages with the handle gear, the transmission gear being formed on an outer peripheral surface of the valve core assembly, and the valve core assembly being driven to move axially relative to the female housing by rotating the handle gear. The handle gear has three control positions, so that the female displacement flow path is alternately opened and closed by alternately rotating the handle gear to a first position and a second position, thereby enabling gas displacement through the female displacement flow path, and the filling and unloading working channel is opened for the filling or unloading of high-pressure gas when the handle gear is in a third position.

In one embodiment, the female housing includes a female gun base having an connection end, as well as a gun body and a gun sleeve fixed to a front end of the female gun base in sequence, the bypass displacement pipeline being arranged within the gun body.

In one embodiment, the valve core assembly includes an outlet valve core and a main valve core, wherein the outlet valve core is installed within the gun sleeve through an outlet valve core sleeve, and the main valve core is installed on the female gun base through a main valve core base and actuated by the handle gear.

In one embodiment, the outlet valve core comprises a hollow tube body and a solid umbrella member provided at one end of the hollow tube body, a first sloping through hole and a second sloping through hole being provided on both axial sides of the solid umbrella member, respectively. The first sloping through hole and the second sloping through hole are configured to be sealed from each other to form a self-sealing state of the female end unit and thus seal the outlet valve core from the main valve core, or be in communication with each other in order to connect the outlet valve core and the main valve core.

In one embodiment, a third resilient member is provided between the outlet valve core and the main valve core, and the solid umbrella member is configured to, under an action of the third resilient member, abut against a sloping surface formed within the outlet valve core sleeve to form a seal, or is disengaged therefrom, so that the first sloping through hole and the second sloping through hole are sealed from or in communication with each other.

In one embodiment, a third annular space is formed between the main valve core base and the female gun base, and is in communication with the connection end of the female gun base. When the handle gear is in the third position, the main valve core is in communication with the third annular space, thereby opening the female filling and unloading flow path.

In one embodiment, the main valve core base has a cylinder structure with a closed end where sloping through holes in communication with the connection end of the female gun base are provided, and switch holes are provided on a side wall of the main valve core base, wherein the sloping through holes are in communication with the switch holes through the third annular space.

In one embodiment, third through holes are distributed on a side wall of the main valve core, and the third through holes are configured to be offset from or align with the switch holes through an axial movement of the main valve core relative to the female housing, thereby closing or opening the female filling and unloading flow path.

In one embodiment, fourth through holes are further provided on the side wall of the main valve core, and a second accumulator sealing ring is provided between the main valve core and the outlet valve core sleeve, wherein the fourth through holes, due to the axial movement of the main valve core, are on an axially inner side of the second accumulator sealing ring to open the female displacement flow path, or on an axially outer side thereof to close the female displacement flow path.

In one embodiment, the male end unit includes a male gun base, a diverter valve fixedly mounted within the male gun base, and a pilot valve adaptively cooperating with the diverter valve, an axial end surface of the pilot valve closely fitting an axial end surface of the valve core assembly when the male end unit is connected to the female end unit. The pilot valve is configured to form the male pilot flow path in the male end unit when the handle gear is in the second position, and to form the male filling and unloading flow path in the male end unit when the handle gear is in the third position.

In one embodiment, the pilot valve comprises a pilot valve seat and a pilot valve core adaptively cooperating with the pilot valve seat, a first annular space in communication with the diverter valve being formed between the pilot valve seat and the male gun base, and a second annular space being formed between the pilot valve core and the male gun base. When the handle gear is in the first position and the second position, the first annular space and the second annular space are sealed off from each other, thereby closing the male filling and unloading flow path. When the handle gear is in the third position, the first annular space is in communication with the second annular space, thereby opening the male filling and unloading flow path.

In one embodiment, the pilot valve core comprises a hollow tube inserted into the pilot valve seat and a valve head connected to one end of the hollow tube, and the valve head is provided with a center through hole in communication with the hollow tube and a plurality of sloping holes extending through the valve head and evenly distributed in a circumferential direction, the sloping holes being in communication with the second annular space.

In one embodiment, a plurality of first through holes is evenly distributed in a circumferential direction on the hollow tube, and a plurality of second through holes is evenly distributed in a circumferential direction on the pilot valve seat. When the handle gear is in the first position and the third position, the first through holes are offset from the second through holes to close the male pilot flow path. When the handle gear is in the second position, the first through holes are in communication with the second through holes to open the male pilot flow path.

In one embodiment, a grip sleeve assembly is provided at a front end of the gun sleeve, and includes a grip sleeve and a jaw support sleeve arranged around an outer side and an inner side of the gun sleeve, respectively, and a jaw extending through the gun sleeve. The grip sleeve assembly is configured so that the jaw forms an axial limit to the grip sleeve, thus forming a self-seal on the female end unit, and a radial position of the jaw is limited by axially pushing the jaw support sleeve, so that the female end unit is connected to and sealed from the male end unit, or disconnected from the male end unit.

In one embodiment, a displacement gas flow path in communication with the displacement gas pipeline and a high-pressure gas flow path in communication with the high-pressure gas pipeline are provided within the double-channel rotating joint.

In one embodiment, the double-channel rotating joint comprises a rotating valve core in which a center blind hole and a displacement gas flow hole extending along an axial direction are provided, and a valve core sleeve arranged around the rotating valve core and comprising a port extending through a side wall thereof, wherein the valve core sleeve is configured to rotate relative to the rotating valve core, so that the displacement gas flow hole is always in communication with the port, thereby forming the displacement gas flow path.

In one embodiment, the port comprises a side-wall through hole and an annular groove formed on an inner wall of the valve core sleeve, wherein the annular groove is in communication with the side-wall through hole, and the displacement gas flow hole is in communication with the annular groove, so that the port remains in communication with the displacement gas flow hole.

In one embodiment, the double-channel rotating joint further comprises a valve core seat fixedly connected to the valve core sleeve; a plurality of axial through holes evenly distributed in a circumferential direction inside the valve core seat; and a valve head fixedly connected to the valve core seat, wherein a center blind hole extending along an axial direction and a plurality of radial through holes evenly distributed in a circumferential direction are provided within the rotating valve core, the center blind hole, the radial through holes, the axial through holes and an inner cavity of the valve head being sequentially in communication to form the high-pressure gas flow path.

In one embodiment, a protrusion extending in an axial direction is provided at a second end of the rotating valve core, and rotationally connected to the valve core seat through a plane bearing.

In one embodiment, the valve core sleeve and the valve core seat are fixedly connected to each other in a mutually-embedded manner to form a seal, and a slot passage is formed between the valve core sleeve and an axial end surface of the valve core seat, the radial through holes being in communication with the axial through holes through the slot passage.

Compared with the prior arts, the present invention has the following advantages.

The double-channel rotating joint used in the high-pressure gas filling and unloading system according to the present invention comprises a high-pressure gas flow path and a displacement gas flow path. Due to the multiple sealing structures of the high-pressure gas filling and unloading system, the rotating valve core can still rotate smoothly between the valve core sleeve and the valve core seat even when high-pressure gas exists, thus effectively ensuring the safe discharge of the displacement gas before and after the filling and unloading of high-pressure gas, and the safety of pipelines during the filling and unloading of high-pressure gas. With the combination of the high-pressure gas pipeline and the displacement gas pipeline with the plurality of double-channel rotating joints, the high-pressure gas filling and unloading arm according to the present invention forms the high-pressure gas flow pipeline and the displacement-gas flow path, and realizes the hard-pipeline connection between the filling and unloading pipeline and the high-pressure gas tube bundle vehicle, thus ensuring the safety of the filling and unloading of high-pressure gas. With the cooperation between the high-pressure gas filling and unloading arm and the filling and unloading joint, the high-pressure gas filling and unloading system according to the present invention, by rotating the handle of the filling and unloading joint, is able to realize the displacement of air within the female end unit before the filling and unloading of high-pressure gas, and the displacement of high-pressure gas within the female end unit after the filling and unloading. The displacement gas is discharged overhead through the displacement gas pipeline of the high-pressure gas filling and unloading arm, which greatly reduces the amount and the risk of high-pressure gas displacement.

BRIEF DESCRIPTION OF THE DRAWINGS

In the following the present invention will be described with reference to the accompanying drawings.

In the present application, all accompanying drawings are schematic ones, provided to illustrate the principle of the present invention merely, and are not necessarily drawn to actual scale.

DETAILED DESCRIPTION OF EMBODIMENTS

The present invention will be described below with reference to the accompanying drawings. It is to be noted that the following detailed description is provided merely for the purpose of illustrating the principle of the present invention, and do not thereby limit the scope of protection of the present invention.

Figure 1:
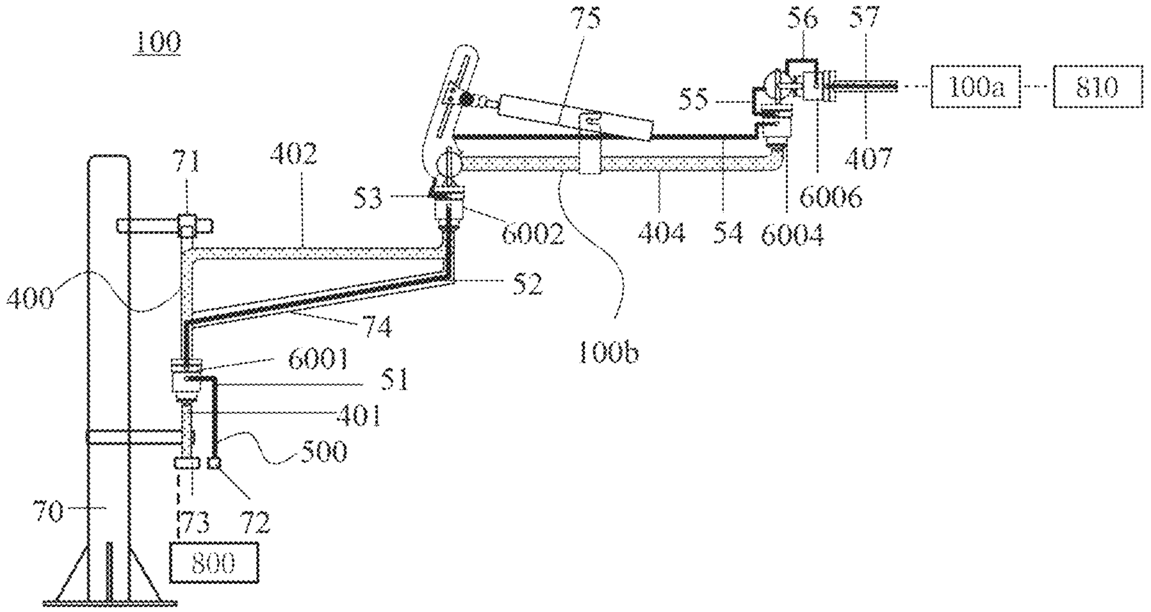
FIG. 1 schematically shows a structure of a high-pressure gas filling and unloading system according to the present invention.

FIG. 1 schematically shows a structure of a high-pressure gas filling and unloading system 100 according to the present invention. As shown in FIG. 1, the high-pressure gas filling and unloading system 100 includes a filling and unloading arm 100*b*, and a filling and unloading joint 100*a* provided at a free end of the filling and unloading arm 100*b*. The filling and unloading arm 100*b* comprises a high-pressure gas pipeline 400 and a displacement gas pipeline 500 for connecting to high-pressure gas filling station 800 (i.e., hydrogen station), and a plurality of double-channel rotating joints 600 provided in the high-pressure gas pipeline 400, wherein each of the double-channel rotating joints 600 is formed as a rotating joint of the high-pressure gas pipeline 400. A displacement gas flow path 600*a* and a high-pressure gas flow path 600*b* are provided inside the double-channel rotating joint 600, wherein the high-pressure gas pipeline 400 is in communication with the high-pressure gas flow path 600*b*, and the displacement gas pipeline 500 is communication with the displacement gas flow path 600*a*. Hence, the filling and unloading arm 100*b* is formed as a double-channel filling and unloading arm with the high-pressure gas pipeline 400 and the displacement gas pipeline 500. During the rotation of each of the double-channel rotating joints 600, the high-pressure gas pipeline 400 and the displacement gas pipeline 500 are independent of and do not affect each other, which significantly enhances the flexibility and safety of the filling and unloading arm 100*b*. The high-pressure gas pipeline 400 is able to rotate under pressure through the double-channel rotating joints 600, thereby enabling the free end of the filling and unloading arm 100*b* to move in three-dimensional space. The filling and unloading joint 100*a* comprises a male end unit 200, a female end unit 300, and a control mechanism. The male end unit 200 is connected to a high-pressure gas transportation vehicle or a gas-fueled device 810. The high-pressure gas transportation vehicle may be, for example, a high-pressure gas tube bundle vehicle, and the gas-fueled device may be, for example, a vehicle or device fueled by high-pressure gas, such as hydrogen, natural gas, or the like. The female end unit 300 is fixedly connected to the high-pressure gas pipeline 400. The filling and unloading joint 100*a* is connected to the free end of the filling and unloading arm 100*b*. The male end unit 200 is configured to engage with the female end unit 300, and a displacement working channel or a filling and unloading working channel can be formed inside the filling and unloading joint 100*a*. Through the filling and unloading arm 100*b*, the female end unit 300 can move freely to align with the male end unit 200, so that the male end unit 200 and the female end unit 300 can be connected or disconnected with pressure. The filling and unloading joint 100*a* is configured to alternately open the displacement working channel and the filling and unloading working channel by means of the control mechanism, so that the displacement working channel is in communication with the displacement gas pipeline 500 for gas displacement, or the filling and unloading working channel is in communication with the high-pressure gas pipeline 400 for high-pressure gas filling or unloading. In this manner, the filling and unloading joint 100*a* can switch over the channels and adapt to the free switching of the working states of the filling and unloading arm 100*b*, thereby realizing safe displacement of the gas in the pipeline and the filling and unloading of high-pressure gas. It is to be noted that in the present application, "opening" includes opening or forming.

The high-pressure gas filling and unloading system 100 according to the present invention can fill or unload high-pressure gas, which may be, for example, hydrogen, CNG or helium filled, unloaded and transported by a long-tube trailer. The pressure of the high-pressure gas ranges from 10 to 50 MPa.

Figure 2:
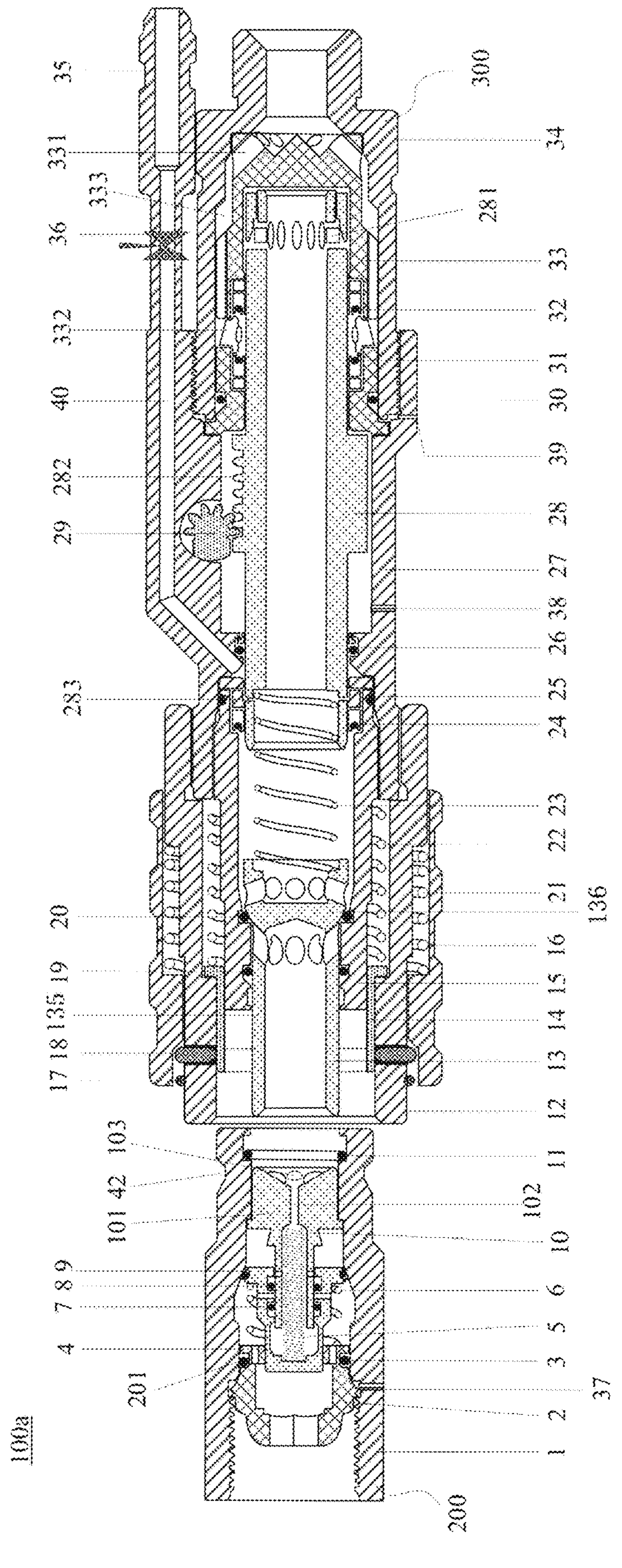
FIG. 2 shows a structure of a filling and unloading joint when a male end unit thereof is separated from a female end unit thereof in the high-pressure gas filling and unloading system as shown in FIG. 1.

FIG. 2 shows the structure of the filling and unloading joint 100*a* when the male end unit 200 thereof is separated from the female end unit 300 thereof (i.e., in a first state) according to the present invention. As shown in FIG. 2, the filling and unloading joint 100*a* comprises a male end unit 200 and a female end unit 300. The male end unit 200 is connected to the high-pressure gas tube bundle vehicle (tanker), and the female end unit 300 is connected to a filling and unloading column of the gas filling station. The male end unit 200 and the female end unit 300 can be quickly connected and disconnected to each other, thereby realizing rapid connection and disconnection with the high-pressure gas tube bundle vehicle and the high-pressure gas filling pipeline, which can be very helpful to ensure the safety of filling and unloading, and the reliability of the sealing at the connection between the high-pressure gas tube bundle vehicle and the high-pressure gas filling pipeline. In this manner, fast filling and unloading for the high-pressure gas tube bundle vehicle can be realized. When the male end unit 200 is disconnected from the female end unit 300, the filling and unloading joint 100*a* is in the first state. When the male end unit 200 is connected to the female end unit 300, the filling and unloading joint 100*a* is in a second state.

According to the present invention, as shown in FIG. 2, the female end unit 300 comprises a female housing, a valve core assembly arranged within the female housing, and a bypass displacement pipeline 40 formed within the female housing. An inner cavity of the female end unit 300 is configured to be in communication with the bypass displacement pipeline 40 to form a female displacement flow path. The valve core assembly is configured to move axially relative to the female housing to close the female displacement flow path and form a female filling and unloading flow path within the female end unit 300. The control mechanism, which is provided on the female end unit 300, is configured to drive the axial movement of the valve core assembly, so that a male pilot flow path and the female displacement flow path are alternately in communication with the interior of the female end unit 200, in order to control the displacement working channel for gas displacement. Furthermore, through the axial movement of the valve core assembly driven by the control mechanism, a male filling and unloading flow path is in communication with the female filling and unloading flow path, thereby opening the filling and unloading working channel and performing filling or unloading of high-pressure gas. The control mechanism comprises a handle gear 29 provided on the female housing, and a transmission gear 282 which engages with the handle gear 29. The transmission gear 282 is formed on an outer peripheral surface of the valve core assembly. Rotation of the handle gear can drive the valve core assembly to move axially relative to the female housing. The handle gear has three control positions. The female displacement flow path is alternately opened and closed when the handle gear 29 is rotated to a first position and a second position respectively, thereby enabling gas displacement through the female displacement flow path. When the handle gear 29 is in a third position, the filling and unloading working channel is opened for the filling or unloading of high-pressure gas.

As shown in FIG. 2, the female housing includes a female gun base 34 having an attachment end, a gun sleeve 12 attached to a front end (left end in FIG. 3) of the female gun base 34, and a gun body 27 fixedly connected between the female gun base 34 and the gun sleeve 12. The bypass displacement pipeline 40 is arranged inside the gun body 27. The valve core assembly includes an outlet valve core 13 arranged within the gun sleeve 12, and a main valve core 28 provided on the female gun base 34. The outlet valve core 13 is arranged within the gun sleeve 12 through an outlet valve core sleeve 15. The main valve core 28 is arranged on the female gun base 34 through a main valve core base 33, and can be actuated by the handle gear 29. The term "front end" herein refers to an end of the female end unit 300 away from the high-pressure gas filling line of the gas filling station when being connected, and the term "rear end" herein refers to an end of the female end unit 300 near the high-pressure gas filling line of the gas filling station when being connected.

As shown in FIG. 2, the gun sleeve 12 has a tubular structure. A right end of the gun sleeve 12 is provided with internal threads, and a left end of the gun body 27 is provided with external threads, so that the gun sleeve 12 is connected to the gun body 27 through threads.

According to the present invention, as shown in FIG. 2, the outlet valve core 13 comprises a hollow tube body 135 and a solid umbrella member 136 provided at one end of the hollow tube body 135, with a first sloping through hole 131 and a second sloping through hole 132 provided on both axial sides of the solid umbrella member, respectively. The outlet valve core sleeve 15 has a tubular structure. A right side of the outlet valve core sleeve 15 is provided with external threads, and a left side of the gun body 27 is provided with internal threads, so that the outlet valve core sleeve 15 is connected to the gun body 27 through threads. An arc groove is provided at the right end of the outlet valve core sleeve 15 along a circumferential direction, and an O-ring seal 25 is installed in the arc groove, which ensures the sealing at a connection surface between the outlet valve core sleeve 15 and the gun body 27. A trapezoidal groove and a rectangular groove are provided on an inner wall of the outlet valve core sleeve 15, wherein the rectangular groove is provided on an axially inner side of the trapezoidal groove. An O-ring seal 19 is installed in the trapezoidal groove, and an O-ring seal 20 is installed in the rectangular groove. An outer wall surface of a left-side tube portion of the outlet valve core 13 is in close contact with the O-ring seal 19, thereby realizing the sealing therebetween.

A portion of the inner wall of the outlet valve core sleeve 15 is formed as a sloping surface, on which the rectangular groove is correspondingly provided. Moreover, an annular space is formed between the outlet valve core 13 and the outlet valve core sleeve 15.

The outlet valve core 13 is correspondingly arranged within the gun sleeve 12, and the main valve core 28 is mounted on the female gun base 34 and correspondingly, within the gun body 27. A third resilient member 23, preferably a compression spring, is provided between the outlet valve core 13 and the main valve core 28. A first concave step is provided on a right side of the outlet valve core 13, and a second concave step is provided at a left end of the main valve core 28. Accordingly, a left end of the third resilient member 23 is pressed against the first concave step of the outlet valve core 13, and a right side thereof is pressed against the second concave step of the main valve core 28. In the first state, the solid umbrella member, under the action of the third resilient member 23, forms a seal by abutting against the sloping surface in the outlet valve core sleeve 15 and tightly pressing the O-ring seal 20, so that the first sloping through hole 131 and the second sloping through hole 132 are not in communication with each other, thereby ensuring that the female end unit 300 is in a self-sealing state. In the second state, however, the outlet valve core 13 is capable of moving inwardly along an axial direction to compress the third resilient member 23, so that the solid umbrella member is disengaged from the sloping surface in the outlet valve core sleeve 15. Thus, the first sloping through hole 131 and the second sloping through hole 132 are in communication with each other through the annular space formed between the outlet valve core 13 and the outlet valve core sleeve 15.

According to the present invention, the main valve core 28 is mounted on the female gun base 34 through the main valve core base 33 fixedly mounted inside the female gun base 34. A third annular space 333 is formed between the main valve core base 33 and the female gun base 34, and is in communication with a connection end of the female gun base 34. The control mechanism is capable of actuating the axial movement of the main valve core 28, so that the main valve core 28 is in communication with the third annular space 333 or not, thereby turning off or on the female filling and unloading flow path within the female end unit 300. The main valve core base 33 has a cylinder structure with a closed end. The main valve core base 33 has, at its right side, a circular bottom surface, into which a right end of the main valve core 28 is inserted. A plurality of sloping through holes 331 is provided at the closed end of the main valve core base 33, and a plurality of switch holes 332 is distributed evenly along the circumferential direction on the sidewall of the main valve core base 33. The sloping through holes 331 are in communication with the switch holes 332 through the third annular space 333. A plurality of third through holes 281 is distributed evenly along the circumferential direction on a side wall of the main valve core 28 closer to an axial inward end. Two internal concave steps are arranged on the side wall of the main valve core base 33 at both sides of the switching holes 332. Two first accumulator sealing rings 31 and 32 are mounted on the two internal concave steps to achieve a seal between the main valve core 28 and the main valve core base 33. The main valve core 28 is configured to enable that the third through holes 281 are offset from the switch holes 332 axially, in order to turn off the main valve core 28, and to move axially with respect to the main valve core base 33, so that the third through holes 281 are in communication with the corresponding switch holes 332, thereby turning on the main valve core 28.

In one embodiment, external short threads are provided on a left side of the main valve core base 33, and internal short threads are provided on a right side of the gun body 27, so that the main valve core base 33 is connected to the gun body 27 through threads. The female gun base 34 has a tubular structure. External threads are provided on a left side of the female gun base 34, and internal threads are provided on a right side of the gun body 27, so that the female gun base 34 is connected to the gun body 27 through threads. The main valve core base 33 is arranged inside the female gun base 34. A trapezoidal groove is provided on a left outer wall of the main valve core base 33, and a third sealing member 30 is installed inside the trapezoidal groove. The third sealing member 30 is preferably an O-type sealing ring 30, so as to realize the sealing between the main valve core base 33 and the female gun base 34.

According to the present invention, the gun body 27 is provided with a third leakage detection hole 39. Preferably, the third leakage detection hole 39 is provided on a side wall of the gun body 27 near a rear end thereof. Specifically, the third leakage detection hole 39 is provided at a left end of the internal threads on the right side of the gun body 27. A portable gas (such as hydrogen) detector can be used to detect the sealing performance of the corresponding seal ring of the filling and unloading joint 100*a*. Accordingly, through the third leakage detection hole 39 it can detect leakage of the seal ring in real time during the filling and unloading of high-pressure gas, so that the third leakage detection hole 39 can be used to monitor whether the O-ring 30 has failed to seal.

Figure 7:
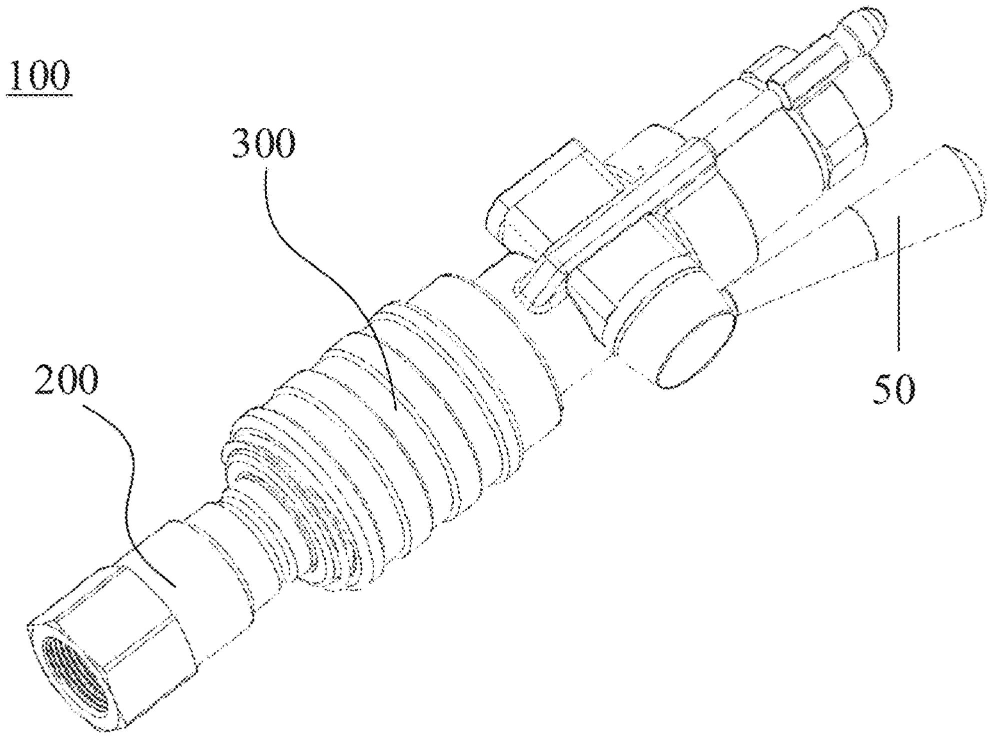
FIG. 7 is a perspective view of the filling and unloading joint.

As shown in FIG. 2, an annular boss is provided on an outer peripheral surface of the main valve core 28 near the center, and transmission teeth 282 are formed on the annular boss and distributed along the axial direction. The handle gear 29 is provided on an inner wall of the gun body 27 and engages the transmission teeth 282, so that the main valve core 28 can be driven to move in the axial direction by rotating the handle gear 29. A large arcuate groove is provided on the side wall of the gun body 27, and the handle gear 29 is installed in the large arcuate groove of the gun body 27. A handle 50 is provided outside the gun body 27 (see FIG. 7), and connected to the handle gear 29. The rotation of the handle gear 29 is controlled by the handle 50 at an angle of 0-180°. Specifically, when the rotation angle of the handle gear 29 is 0°, the control mechanism is in a zero position, i.e. the handle gear 29 is in a first position. When the rotation angle of the handle gear 29 is 45 degrees, the handle gear 29 is in a second position. When the rotation angle of the handle gear 29 is 180 degrees, the handle gear 29 is in a third position.

According to the present invention, as shown in FIG. 2, the bypass displacement pipeline 40 is arranged in the gun body 27. One end of the bypass displacement pipeline 40 is in communication with the internal space of the gun body 27, and the other end thereof is formed as a displacement gas valve port 35. The bypass displacement pipeline 40 can open the displacement working channel, and is in communication with the displacement gas pipeline 500 of the filling and unloading arm 100*a*, so as to realize the displacement of air inside the female end unit 300 before filling and unloading, and the displacement of high-pressure gas inside the female end unit 300 after filling and unloading. In this manner, the displacement amount of high-pressure gas and the risk in high-pressure gas displacement can be significantly reduced. The gas displacement channel 40 is provided with a needle valve 36 for controlling the turning on or off state of the bypass displacement pipeline 40. The displacement gas valve port 35 can be connected to the overhead discharge line or the nitrogen line by switching valves on the filling and unloading column of the gas filling station.

In one embodiment, the gun body 27 has an asymmetric tubular structure. For example, a sidewall of an upper tubular portion of the gun body 27 has a thickness larger than that of the lower tubular portion thereof. The displacement gas valve port 35 is provided on the upper portion of the gun body 27, and has a left sloping tube inserted into the gun body 27. An end of the left sloping tube of the displacement gas valve port 35 reaches an attachment on a right end of the outlet valve core sleeve 15. In the gun body 27, a rectangular groove is provided on a right side of the end of the left sloping tube of the displacement gas valve port 35. A second sealing member 26, preferably an O-ring seal, is installed in the rectangular groove, which realizes the sealing between the main valve core 28 and the gun body 27.

According to one embodiment of the present invention, the gun body 27 is provided with a second leakage detection hole 38. Preferably, the second leakage detection hole 38 is provided on a lower tubular portion in the middle of the gun body 27. A portable gas (e.g. hydrogen) detector can be used for leakage detection of the corresponding seal of the filling and unloading joint 100*a*. The second leakage detection hole 38 can be used for leakage detection of the seal in real time during the filling and unloading of high-pressure gas, thereby detecting the sealing performance of the O-ring seal 26.

Preferably, the large arcuate groove for mounting the handle gear 29 is provided within the upper portion of the sidewall of the gun body 27, so that the handle gear 29 is mounted within the upper portion of the side wall of the gun body 27.

According to the present invention, a fourth through hole 283 is provided on a side wall of the main valve core 28 near the axially outward end. For example, a concave step is provided on the left inner wall of the main valve core 28, and a plurality of fourth through holes 283 is distributed evenly along the circumferential direction on the left concave step of the main valve core 28. A concave step is provided on the right inner wall of the outlet valve core sleeve 15, and a second accumulator sealing ring 24 is provided between the left outer wall of the main valve core 28 and the surface of the concave step at the right end of the outlet valve core sleeve 15, thereby realizing a seal between the main valve core 28 and the outlet valve core sleeve 15. The main valve core 28 is able to move along the axial direction. Specifically, the fourth through hole 283 is moved to an axial outer side of the second accumulator sealing ring 24 by rotating the handle gear 29 at an angle of 45° clockwise, thereby closing the male pilot flow path. When the handle gear 29 is in the zero state (see FIG. 2), the fourth through hole 283 moves to an axial inner side of the second accumulator sealing ring 24, thereby connecting the fourth through hole 283 with the bypass displacement pipeline 40 to open the male pilot flow path. In this manner, the male pilot flow path can be opened and closed.

According to the present invention, as shown in FIG. 2, a grip sleeve assembly is provided at a front end of the gun sleeve 12. The grip sleeve assembly includes a grip sleeve 16, a jaw support sleeve 14, and a jaw 18. The grip sleeve assembly is configured so that the jaw 18 forms an axial limit to the grip sleeve 16, thus forming a self-seal on the female end unit 300, and a radial position of the jaw 18 is limited by axially pushing the jaw support sleeve 14, so that the female end unit 300 can be sealingly engaged with or disconnected from the male end unit 200. The grip sleeve 16, which is arranged outside the gun sleeve 12 as a whole, has a tubular structure. A fourth resilient member 21, preferably a compression spring, is provided between the grip sleeve 16 and the gun sleeve 12. A first limiting step with an end surface facing rightward is provided on an inner wall of the grip sleeve 16, and a second limiting step with an end surface facing leftward is provided on an outer wall of the gun sleeve 12. Two ends of the fourth resilient member 21 abut against the first limiting step and the second limiting step, respectively. An arc groove is arranged around a left portion of the gun sleeve 12, and a grip sleeve retaining ring 17 is installed in the arc groove for limiting the axial movement of the grip sleeve 16.

As shown in FIG. 2, a plurality of mounting holes is distributed evenly along a circumferential direction in a sidewall region of the gun sleeve 12 near the left end thereof. The mounting holes extend through the sidewall of the gun sleeve 12, and the jaws 18 are mounted in the mounting holes, respectively. The jaw support sleeve 14, which is provided between the gun sleeve 12 and the outlet valve core sleeve 15, has a tubular structure. An outer flange is provided on a right side of the jaw support sleeve 14. A fifth resilient member 22, preferably a compression spring, is provided between the jaw support sleeve 14 and the gun body 27 along the axial direction. Two ends of the fifth resilient member 22 abut against a right end of the outer flange and a left end surface of the gun body 27, respectively. Meanwhile, a jaw groove 42 is provided on an outer wall of a male gun base 1 near a front end thereof. Under the action of the spring force of the fifth resilient member 22, the outer flange of the jaw support sleeve 14 is always pressed tightly on an inner step surface in the left middle of the gun sleeve 12. When the male end unit 200 and the female end unit 300 are disconnected from each other, the claw support sleeve 14 radially supports the claw 18, so that an arc surface at a radial outer end of the claw 18 is in close contact with the grip sleeve 16, thereby realizing the limiting of the claw 18 on the grip sleeve 16.

In the first state, the jaw support sleeve 14 forms a support for the jaw 18 under the action of the fifth resilient member 22, so that the jaw 18 forms an axial limit to the grip sleeve 16. At this time, under the action of the spring force of the fourth resilient member 21, a left inner sloping surface of the grip sleeve 16 is closely pressed against an outer arc surface of the jaw 18, so that the jaw 18 limits a distance of leftward movement of the grip sleeve 16.

In the second state, the male gun base 1 pushes the jaw support sleeve 14 to move axially and compresses the fifth resilient member 22, until the plurality of jaws fall into the corresponding jaw grooves 42, respectively, so as the male gun base 1 is locked with the gun sleeve 12 to form a self-seal, thereby connecting the male end unit 200 with the female end unit 300. When the male end unit 200 and the female end unit 300 are connected with each other, and the jaws 18 fall into the grooves 42 of the male gun base 1, the grip sleeve 16 continues to move leftward under the action of the fourth resilient member 21, until the left inner sloping surface of the grip sleeve 16 is tightly pressed against an outer arc surface of the grip sleeve retaining ring 17.

In this embodiment, the grip sleeve 16 is configured to move axially by applying a force in the second state, and the jaw 18 is configured to jump automatically from the jaw groove 42 when the grip sleeve moves until the inner wall surface thereof leaves the mounting holes, so that the plurality of jaws 18 is reset and re-exert a limiting effect on the grip sleeve 16, and thus the male end unit 200 and the female end unit 300 form a self-sealing. In this manner, a quick and anti-loosening connection between the male end unit 200 and the female end unit 300 can be realized in the filling and unloading joint 100*a* through the cooperation of the jaws 18, the jaw support sleeve 14 and the grip sleeve 16.

According to an embodiment of the present invention, the female gun base 34 of the female end unit 300, the gun sleeve 12, the outlet valve core 13, the outlet valve core sleeve 15, the main valve core 28, the main valve core base 33, the gun body 27, the jaw support sleeve 14, the grip sleeve 16, and other components are all made of 316 stainless steel, which is very helpful to avoid hydrogen embrittlement.

Preferably, the O-ring seals in the present invention are made of UPE, which have good resistance to abrasion, impact, corrosion, hydrogen dissolution and swelling, stamping, and high temperature. The first accumulator sealing rings 31, 32, and the second accumulator sealing ring 24 are made of 304 stainless-steel on the inside and UPE on the outside, and thus have good resistance to hydrogen dissolution and swelling, abrasion, impact and corrosion. At the same time, the accumulator sealing ring has the self-compensating property, which meets the requirement of high-pressure dynamic sealing.

As shown in FIG. 2, the male end unit 200 includes a male gun base 1 for connection to a high-pressure gas tube bundle vehicle, a diverter valve 2 fixedly mounted within the male gun base 1, and a pilot valve 10 in cooperation with the diverter valve 2. One end of the male gun base 1 (left end in FIG. 2) is provided with internal threads, for connecting to the filling and unloading pipeline of the tube bundle vehicle. When the male end unit 200 is connected to the female end unit 300, an axial end surface of the pilot valve 10 closely fits an axial end surface of the valve core assembly in the female end unit 300. The pilot valve 10 is configured to form a male pilot flow path in the male end unit 200 when the handle gear 29 is in the second position, and to form a male filling and unloading flow path in the male end unit 200 when the handle gear 29 is in the third position.

In one embodiment, the diverter valve 2 has a tubular structure, with a left side thereof as a hexagonal hole, and a center of a right side thereof as a circular hole, thereby forming a stepped overflow channel inside the diverter valve 2. An annular lip extending radially inward is provided on an inner wall at a front end of the diverter valve 2, and a plurality of overflow holes 201 distributed evenly in the circumferential direction is provided on the annular lip. The overflow holes 201 extend through the annular lip along the axial direction. An outer surface of the diverter valve 2 is provided with external threads, through which the diverter valve 2 is fixed connected to the male gun base 1. The term "front end" herein refers to an end of the male end unit 200 away from the high-pressure gas tube bundle vehicle when being connected thereto.

In order to ensure the sealing performance at the connection between the diverter valve 2 and the male gun base 1, a rectangular groove is provided at a right outer ring of the diverter valve 2, and a sealing member 3 is installed in the rectangular groove. Preferably, the sealing member 3 is an O-ring seal. In one embodiment, the male gun base 1 is provided with a first leakage detection hole 37. Preferably, the first leakage detection hole 37 is provided on a side wall of the male gun base 1 at a right end of the internal threads. A portable gas detector can be used to perform leakage detection of the corresponding seal of the filling and unloading joint 100*a*. The first leakage detection hole 37 is able to perform leakage detection of the sealing member 3 in real time during the filling and unloading of high-pressure gas, thus monitoring the sealing performance of the O-ring seal 3.

Figure 3:
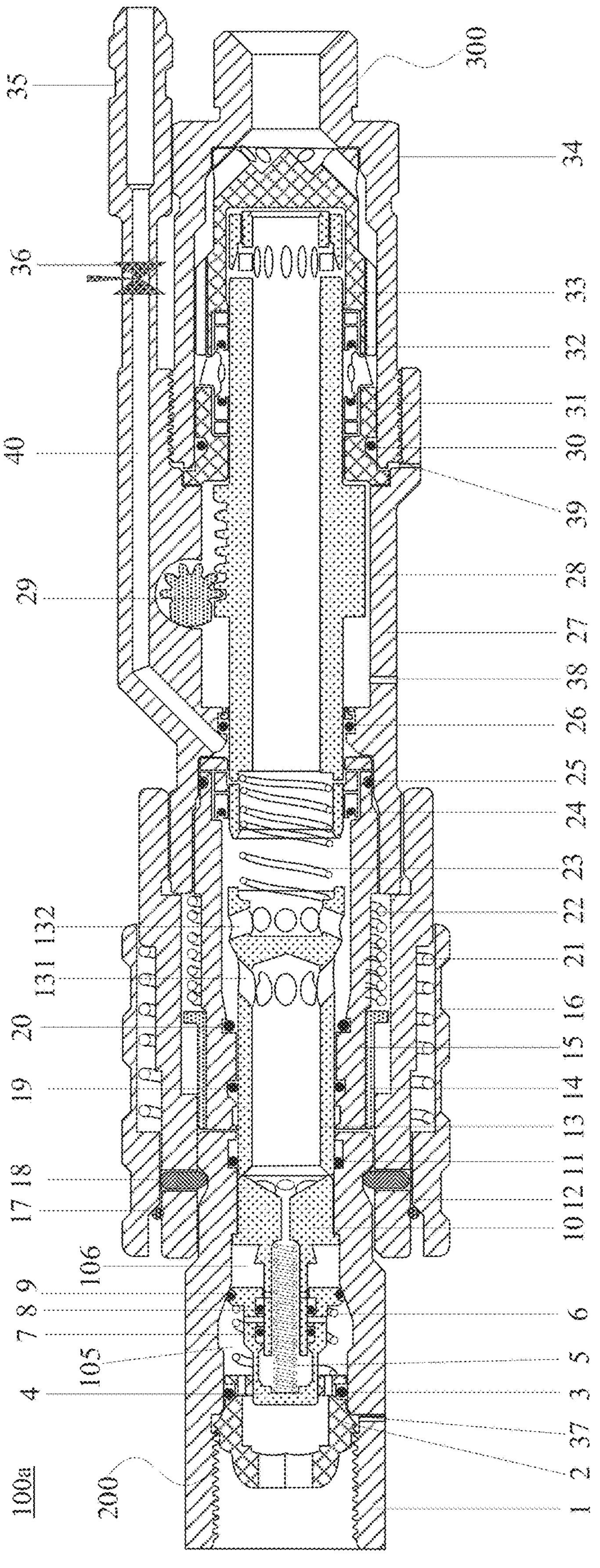
FIG. 3 shows a connection between the male end unit and the female end unit of the filling and unloading joint.

According to the present invention, the pilot valve 10 is configured to move, driven by the control mechanism, along the axial direction relative to the diverter valve 2, in order to form a male pilot flow path or a male filling and unloading flow path within the male end unit 200. As shown in FIG. 3, the pilot valve 10 comprises a pilot valve seat 4 and a pilot valve core 101 adaptively mounted in the pilot valve seat 4. A first annular space 105 in communication with the diverter valve 2 is formed between the pilot valve seat 4 and the male gun base 1, and a second annular space 106 is formed between the pilot valve core 101 and the male gun base 1. When the handle gear 29 is in the first position and the second position, the first annular space 105 and the second annular space 106 are sealed off from each other, thereby closing the male filling and unloading flow path. When the handle gear 29 is in the third position, the first annular space 105 is in communication with the second annular space 106, thereby opening the male filling and unloading flow path.

As shown in FIG. 2, the pilot valve seat 4 has a cylindrical structure, wherein a left side thereof has a circular bottom surface, and a center hole is provided from a right side to the left side. A cylindrical wall surface on the left side of the pilot valve seat 4 is tightly inserted into the circular hole on the right side of the diverter valve 2. Two rectangular grooves are provided on a right side of an inner wall surface of the pilot valve seat 4, and an O-ring seal 7 and an O-ring seal 8 are mounted in the two rectangular grooves, respectively. A plurality of second through holes evenly distributed in the circumferential direction is provided on a side wall of the pilot valve seat 4 between the two rectangular grooves. A conical projection extending radially outward is provided at one end (right end in FIG. 2) of the pilot valve seat 4. A right end surface of the conical projection is configured as a sloping surface with a circular groove. An O-ring seal 9 is provided within the circular groove. A second resilient member 6 is arranged around a periphery of the pilot valve seat 4. Both ends of the second resilient member 6 abut against the conical projection and the annular lip, respectively. The conical projection, under the action of the second resilient member 6, abuts against and is pressed tightly against the sloping surface formed on the inner wall of the male gun base 1, thereby forming a seal. Preferably, the second resilient member 6 is a compression spring.

As shown in FIG. 2, the pilot valve core 101 comprises a hollow tube inserted into the pilot valve seat 4 and a valve head connected to the hollow tube. The valve head is provided with an inner conical surface, which is in communication with the hollow tube through a center through hole 102 extending along the axial direction. The inner conical surface is provided with a plurality of sloping holes 103 extending through the valve head, which is in communication with the second annular space. It should be appreciated that the sloping holes 103 extend from the inner conical surface to a left end surface of the valve head, thereby forming a communication passageway. The left hollow tube of the pilot valve 10 is inserted into the pilot valve seat 4. A plurality of first through holes evenly distributed in the circumferential direction is provided on the hollow tube. When the handle gear 29 is in the first position and the third position, the first through holes are offset from the second through holes to close the male pilot flow path. When the handle gear 29 is in the second position, the first through holes are in communication with the second through holes to open the male pilot flow path. A first resilient member 5, preferably a compression spring, is provided between the pilot valve seat 4 and the pilot valve core 101. A left end of the first resilient member 5 is pressed against the concave step surface on the left side of the pilot valve seat 4, and a right end thereof is pressed against an arc surface of the left hollow tube of the pilot valve core 101.

In this embodiment, a periphery of the valve head of the pilot valve core 101 is provided with an outer annular step having a rightward end surface, while an inner annular step having a leftward end surface is provided on the inner wall of the male gun base 1. With the spring force of the first resilient member 5, the outer annular step of the valve head of the pilot valve core 101 is always tightly pressed against the inner annular step inside the male gun base 1. Accordingly, the inner annular step of the male gun base 1 can limit the distance at which the pilot valve core 101 moves rightward.

According to the present invention, the filling and unloading joint **100*a* has a first state in which the male end unit 200 and the female end unit 300 form respective self-sealing, and a second state in which the male end unit 200 and the female end unit 300 are adapted to abut against each other. In the first state, the first through holes of the pilot valve core 101 are offset from the second through holes of the pilot valve seat 4, thus turning off the pilot valve 10. In the second state, the pilot valve core 101 is pushed by the control mechanism to move leftward and compress the first resilient member 5, so that the first through holes are in communication with the second through holes. Accordingly, the diverter valve 2 is able to be in communication with the overflow holes 201, the first annular space 105 formed between the pilot valve seat 4 and the male gun base 1, the second through holes, the first through holes, and the center through hole 102 in the center of the valve head in sequence, thereby forming the male pilot flow path within the male end unit 200. In the second state, the pilot valve core 101 continues to, through the control mechanism, push the pilot valve seat 4 to compress the second resilient member 6, so that the conical projection is disengaged from the sloping surface of the inner wall of the male gun base, resulting in the first annular space 105 in communication with the second annular space 106. In this manner, the diverter valve 2 is able to be in communication with the overflow holes 201, the first annular space 105, the second annular space 106, and the inclined holes 103, thereby forming the male filling and unloading flow path inside the male end unit 200. The resilient force of the second resilient member 6 is greater than that of the first resilient member 5. Therefore, the male pilot flow path and the male filling and unloading flow path can be opened sequentially when the pilot valve core 101** moves leftward along the axial direction.

In addition, a rectangular groove is provided on the inner wall of the male gun base 1 near the right side, and an O-ring seal 11 is installed in the rectangular groove, thereby ensuring the sealing performance between the male end unit 200 and the female end unit 300 in the connected state.

According to the present invention, the male gun base 1, the diverter valve 2, the pilot valve 10 and other components of the male end unit 200 are all made of 316 stainless steel, which is very helpful to avoid hydrogen embrittlement.

According to the present invention, the filling and unloading joint **100*a* can realize the rapid connection and separation between the high-pressure gas tube bundle vehicle and the high-pressure gas filling pipeline. With the cooperation between the jaws 18, the jaw support sleeve 14 and the grip sleeve 16, the rapid disengagement and anti-loosening connection of the male end unit 200 and the female end unit 300 can be realized. With the cooperative movements of the pilot valve seat 4 and the pilot valve core 101, the outlet valve core 13 can easily push the pilot valve seat 4 open and thus open the high-pressure gas flow path after the male end unit and the female end unit are connected to each other, thereby realizing the rapid filling and unloading of the high-pressure gas, even if there is high-pressure gas inside the male end unit 200. The filling and unloading joint 100***a* realizes the falling off and self-sealing of the diverter valve 2 of the male end unit 200 and the outlet valve core 13 of the female end unit 300 through the resilient members. The gas balance between the outlet valves of the male end unit 200 and the female end unit 300 can be realized through the pilot valve 10, so that the male end unit 200 and the female end unit 300 can be in communication with each other under pressure. By rotating the handle, the male end unit 200 can be disconnected from the female end unit 300 under pressure. The filling and unloading joint 100*a* realizes safe unloading and displacement of high-pressure gas. With the cooperation between the bypass displacement pipeline 40 and the handle, the displacement of the air in the female end unit 300 before filling and unloading and the displacement of the high-pressure gas in the female end unit 300 after filling and unloading can be realized, thereby significantly reducing the amount of high-pressure gas to be displaced and the risk of high-pressure gas displacement, effectively preventing leakage caused by accidental falling off of the joint, ensuring the safe filling and unloading operation of high-pressure gas tube bundle vehicle, which greatly improves the reliability of the overall connection device for filling and unloading operation. In addition, the sealing performance of the ring seals and the corresponding leakages can be monitored in real time during the filling and unloading of high-pressure gas through the first leakage detection hole 37, the second leakage detection hole 38, and the third leakage detection hole 39, which can be achieved by respective portable gas detectors for detecting the sealing performance of respective ring seals in the filling and unloading joint 100*a*. Compared with the gas volume of the current long hose, the filling and unloading joint 100*a* significantly reduces the amount and risk of unloading of high-pressure gas. The operation procedures of the filling and unloading joint 100*a* according to the present invention are illustrated as follows.

First, when filling or unloading high-pressure gas, the male end unit 200 of the filling and unloading joint 100*a* is connected to the high-pressure gas tube bundle vehicle, and the female end unit 300 thereof is connected to the free end of the filling and unloading arm 100*b* arranged in the gas filling station. The filling and unloading arm 100*b* is in communication with the high-pressure gas filling and unloading column of the gas filling station.

Before connecting the male end unit 200 to the female end unit 300, it is necessary to ensure that the handle 50 of the female end unit 300 is rotated at an angle of 0°, so that the handle gear 29 is in the first position, and the handle gear 29 of the female end unit 300 is in the zero state. The operator grips on to the grip sleeve 16 of the female end unit 300 with both hands, and aligns the gun sleeve 12 with the male gun base 1 of the male end unit 200. The female end unit 300 is pushed to the left as a whole, so that the right end surface of the male gun base 1 abuts against the left end surface of the jaw support sleeve 14. The male gun base 1 drives the jaw support sleeve 14 to move rightward, so that the fourth resilient member 21 is compressed. When the jaw groove 42 of the male gun base 1 aligns the radially inner end of the jaw 18, the outer arc surface of the jaw 18 is subjected to a radial force from the left inner sloping surface of the grip sleeve 16, so that the jaw 18 falls into the jaw groove 42 of the male gun base 1 instantly. Then, the grip sleeve 16 continues to move to the left under the action of the fourth resilient member 21, until the left inner sloping surface of the grip sleeve 16 is tightly pressed against the outer arc surface of the grip sleeve retaining ring 17, thereby forming a limit. FIG. 3 shows a state when the male end unit 200 and the female end unit 300 of the filling and unloading joint 100*a* are connected to each other. At this state, the pilot valve core 101 moves only slightly to the left, but the pilot valve 10 is not open. The outlet valve core 13 moves to the right relative to the main valve core 28. The third resilient member 23 is further compressed. The sealing between the outlet valve core 13 and the male gun base 1 is realized by the O-ring seal 11.

Prior to the filling and unloading of high-pressure gas, it is necessary to displace the air in the outlet valve core 13 and the main valve core 28. By switching the valve of the filling and unloading column of the gas filling station, the nitrogen with a pressure of 0.6 MPa can flow to the bypass displacement pipeline 40 through the displacement gas pipeline 500 of the filling and unloading arm 100*b*. That is, the bypass displacement pipeline 40 of the female end unit 300 is connected to the nitrogen gas pipeline of the filling and unloading column. First, the female displacement flow path is opened by turning on the needle valve 36, so that the nitrogen with a pressure of 0.6 MPa is replenished into the outlet valve core 13 and the main valve core 28 via the female displacement flow path. Then, the needle valve 36 is turned off. By switching the valve of the filling and unloading column, the bypass displacement pipeline 40 is connected to the overhead discharge line of the filling and unloading column via the displacement gas pipeline 500 of the filling and unloading arm 100*b*. Afterwards, the needle valve 36 is turned on again, thus discharging the gas in the outlet valve core 13 and the main valve core 28 into the overhead discharge line of the filling and unloading column via the female displacement flow path and the displacement gas pipeline 500 of the filling and unloading arm 100*b*. The above operations are repeated at least twice to replenish the nitrogen, thereby completely displacing the gas in the outlet valve core 13 and the main valve core 28 by nitrogen.

Figure 4:
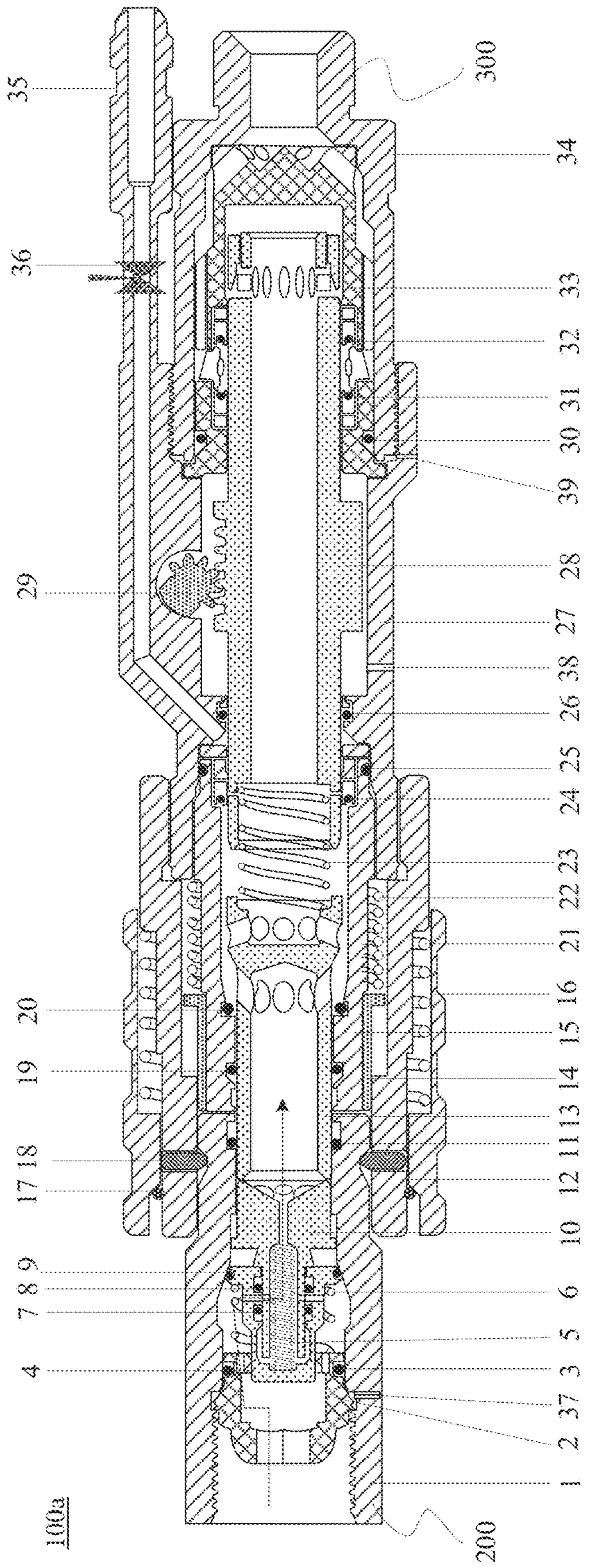
FIG. 4 shows a pilot valve of the filling and unloading joint in an open state.

Then, the handle is rotated clockwise by 45° so that the handle gear 29 is in the second position. The transmission gear 282 on the main valve core 28 is driven by the handle gear 29, so that the main valve core 28 moves to the left. The main valve core 28 pushes the third resilient member 23 to the left, the third resilient member 23 pushes the outlet valve core 13 to the left, and the outlet valve core 13 pushes the pilot valve 10 to the left. The first through holes on the hollow tube of the pilot valve 10 overlaps and aligns with the second through holes of the pilot valve seat 4, so that the displacement channel of the pilot valve 10 is opened, thereby opening the male pilot flow path inside the male end unit 200. FIG. 4 shows the pilot valve 10 of the filling and unloading joint 100*a* in an open state. At this time, the high-pressure gas in the high-pressure gas tube bundle vehicle enters the inside of the diverter valve 2 through the left hexagonal hole of the diverter valve 2, and enters the outlet valve core 13 and the main valve core 28 via the right circular hole of the diverter valve 2, the overflow hole 201, the first annular space 105, the second through holes of the pilot valve seat 4, the first through holes of the hollow tube of the pilot valve core 101, and the male pilot flow path formed by the center through hole 102 of the pilot valve core 101. At this time, the high-pressure gas from the filling and unloading column connected to the female end unit 300 through the high-pressure gas pipeline 400 of the filling and unloading arm 100*b* is still sealed on the right side of the two first accumulator sealing rings 31, 32.

Then, the handle is rotated counterclockwise by 45°, so that the handle gear 29 returns to the first position, and the handle 50 is in the zero state again. By switching the valve of the filling and unloading column, the displacement gas valve port 35 is connected to the overhead discharge line of the filling and unloading column via the displacement gas pipeline 500 of the filling and unloading arm 100*b*. Then the needle valve 36 is turned on, and the gas in the outlet valve core 13 and the main valve core 28 is discharged. The above operations are repeated to replenish the high-pressure gas twice from the high-pressure gas tube bundle vehicle, thereby completing the displacement of the nitrogen in the outlet valve core 13 and the main valve core 28 by high-pressure gas.

Figure 5:
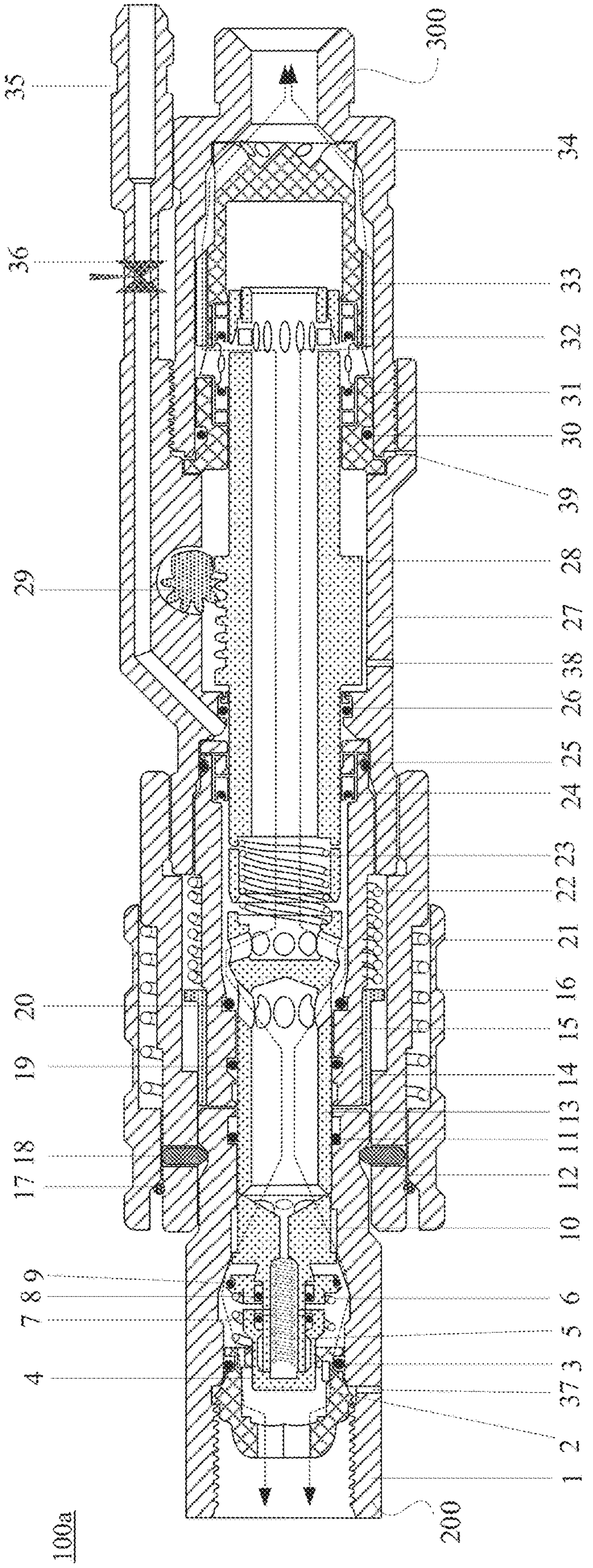
FIG. 5 shows an internal channel of the filling and unloading joint in an open state.

Next, the needle valve 36 is turned off. As shown in FIG. 4, the handle is rotated clockwise by 45°, so that the handle gear 29 is in the second position. The pilot valve 10 is turned on to open the male pilot flow path. At this time, the high-pressure gas in the male end unit 200 enters the outlet valve core 13 and the main valve core 28 of the female end unit 300 through the male pilot flow path. A pressure balance is realized in the gas-phase space between the left and right sides of the pilot valve 10. Then, as shown in FIG. 5, the handle continues to be rotated clockwise by 180° to reach the third position. The handle gear 29 on the main valve core 28 is driven to move the main valve core 28 to the left. The main valve core 28 pushes the third resilient member 23 to the left, the third resilient member 23 pushes the outlet valve core 13 to the left, and the outlet valve core 13 pushes the pilot valve core 101 to the left. The left end surface of the pilot valve core 101 abuts against the left bottom surface within the pilot valve seat 4, so that the pilot valve core 101 drives the pilot valve seat 4 to move to the left. The O-ring seal 9 on the boss on the right outer annular surface of the pilot valve seat 4 leaves the inner sloping surface of the male gun base 1. Then the first annular space 105 is in communication with the second annular space 106, and the external gas flow space of the pilot valve seat 4 is opened, thereby opening the male filling and unloading flow path. Meanwhile, when the handle is rotated by 180° and the main valve core 28 is moved to the left in place, the third through holes 281 on the right side of the main valve core 28 coincide with the switch holes 332 in the middle of the main valve core base 33, so that the gas-phase space of the main valve core 28 is in communication with the external space of the main valve core base 33, thereby opening the female filling and unloading flow path. Thus, the male filling and unloading flow path is in communication with the female filling and unloading flow path, thereby opening the filling and unloading working channel within the filling and unloading joint 100*a*. The high-pressure gas is filled along the following direction (indicated by the arrow to the left in FIG. 5). The high-pressure gas in the filling and unloading line of the filling and unloading column enters the interior of the female gun base 34 of the female end unit 300 via the high-pressure gas pipeline 400 of the filling and unloading arm 100*b*, passes through the sloping through holes 331 on the right circular bottom surface of the main valve core base 33 from the interior of the female gun base 34 to enter the third annular space 333 between the main valve core base 33 and the female gun base 34. Then, the high-pressure gas enters the interior of the main valve core 28 through the third through holes 281 and the switch holes 332, moves leftward through the second sloping through hole 132 on the right side of the solid umbrella member of the outlet valve core 13, the annular space between the outlet valve core 13 and the outlet valve core sleeve 15, and the first sloping through hole 131 in sequence to enter the interior of the outlet valve core 13. Then, the high-pressure gas continues to move leftward to enter the right inner conical space of the pilot valve core 101, and passes through the sloping holes 103 on the valve head of the pilot valve 10 to enter the exterior space of the pilot valve seat 4. Then, the high-pressure gas passes through the overflow holes 201 on the right side of the diverter valve 2 to enter the interior space of the diverter valve 2, passes through the left hexagonal hole of the diverter valve 2 to enter the filling and unloading pipeline of the high-pressure gas tube bundle vehicle. The high-pressure gas is unloaded along an opposite direction of the above flow direction of filling gas (indicated by the arrow to the right in FIG. 5). FIG. 5 shows the internal channel of the filling and unloading joint 100*a* in an open state.

Figure 6:
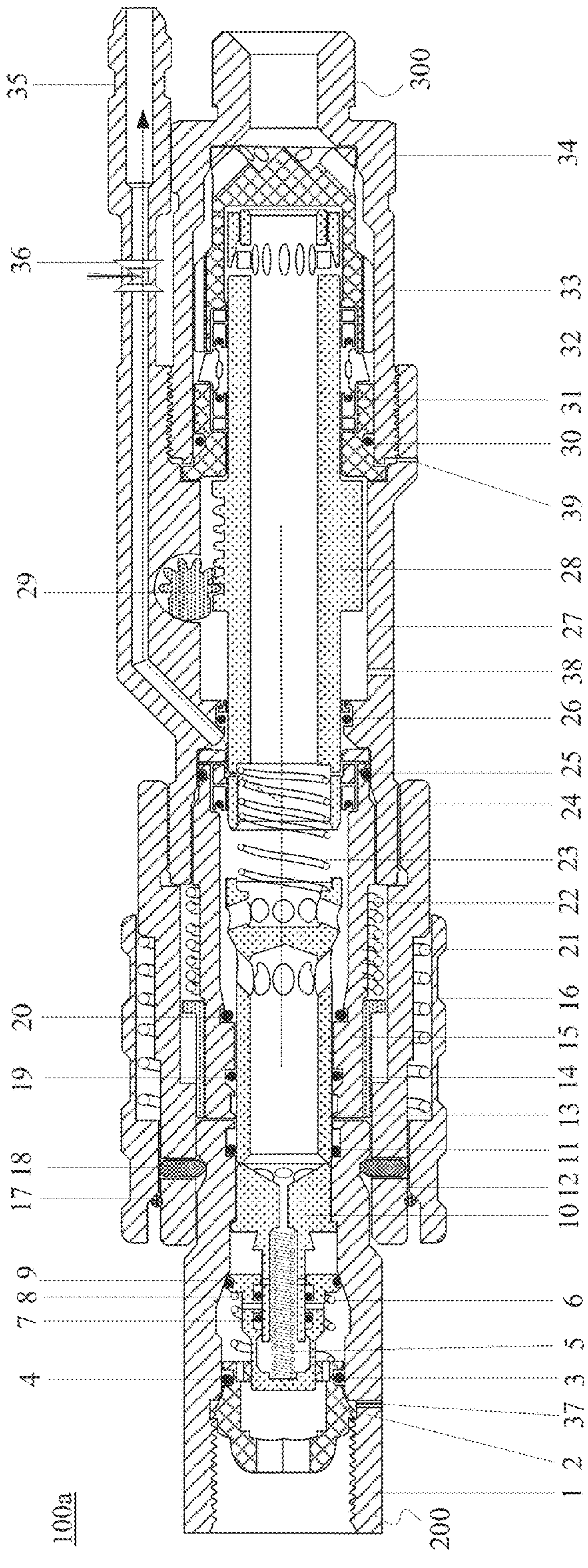
FIG. 6 shows a gas displacement channel of the filling and unloading joint in an open state.

After completing the high-pressure gas filling and unloading operation, the handle is rotated counterclockwise by 180°, so that the handle is in the zero state. At this time, the high-pressure gas at the end of the high-pressure gas tube bundle vehicle is sealed on the left side of O-ring seal 9 again. The high-pressure gas from the filling and unloading column connected with the female end unit 300 via the high-pressure gas pipeline 400 of the filling and unloading arm 100*b* is sealed on the right side of the two first accumulator sealing rings 31 and 32 again. By switching the valve of the filling and unloading column, the displacement gas valve port 35 is connected to the overhead discharge line of the filling and unloading column via the displacement gas pipeline 500 of the filling and unloading arm 100*b*. Then the needle valve 36 is turned on, and the high-pressure gas in the outlet valve core 13 and the main valve core 28 is discharged through the female displacement flow path. The high-pressure gas flows as follows. The high-pressure gas passes through the fourth through holes 283 of the left concave step of the main valve core 28 from the interior space of the outlet valve core 13 and the main valve core 28 to enter a slit between the main valve core 28 and the end of the left sloping tube of the displacement gas valve tube 35. Then, the high-pressure gas enters the left sloping tube of the displacement gas valve tube 35 and the horizontal tube of the bypass displacement pipeline 40, and passes through the needle valve 36 to enter the displacement gas pipeline 500 of the filling and unloading arm 100*b*, thereby entering the filling and unloading pipeline of the filling and unloading column. FIG. 6 shows the displacement gas valve port 35 and the needle valve 36 of the filling and unloading joint 100*a* in an open state.

When the gas in the outlet valve core 13 and main valve core 28 is discharged to reach the atmospheric pressure, the needle valve 36 is turned off. By switching the valve of the filling and unloading column, the displacement gas valve port 35 is connected to the nitrogen pipeline of the filling and unloading column via the displacement gas pipeline 500 of the filling and unloading arm 100*b*. The needle valve 36 is turned on again, and the nitrogen under the pressure of 0.6 MPa is replenish into the outlet valve core 13 and the main valve core 28 via the female displacement flow path. Then the needle valve 36 is turned off, so that the displacement gas valve port 35 is connected to the overhead discharge pipeline of the filling and unloading column via the displacement gas pipeline 500 of the filling and unloading arm 100*b* by switching the valve of the filling and unloading column. Then the needle valve 36 is turned on again, so that the gas in the outlet valve core 13 and the main valve core 28 is discharged via the female displacement flow path. The above operations are repeated to replenish the nitrogen twice, thereby completing the displacement of the gas in the outlet valve core 13 and the main valve core 28 by nitrogen.

After the gas displacement is completed, the operator grips on to the grip sleeve 16 with both hands to move leftward. When the left inner sloping surface of the grip sleeve 16 is located directly above the jaw 18, the spring force of the fifth resilient member 22 acts on the right end surface of the jaw support sleeve 14 which is pushed to move to the left. The jaw support sleeve 14 exerts a leftward axial force on the male gun base 1, and the sloping surface of the jaw groove 42 of the male gun base 1 exerts an outward axial force on the jaw 18. Thus, the claw 18 instantly jumps up, and the inner bottom surface of the jaw 18 is supported on the outer wall surface of the jaw support sleeve 14. Meanwhile, the outer arc surface of the jaw 18 is tightly pressed on the left inner sloping surface of the grip sleeve 16. The leftward movement of the grip sleeve 16 is limited by the jaw 18. After the male gun base 1 is disengaged from the gun sleeve 12, the outer arc surface of the solid umbrella member of the outlet valve core 13 is in close contact with the O-ring seal 20 to realize the sealing. Thus, the male end unit 200 can be disengaged from the female end unit 300.

The direction of the arrows in FIGS. 4 and 5 indicates the flow direction of the gas.

Figure 8:
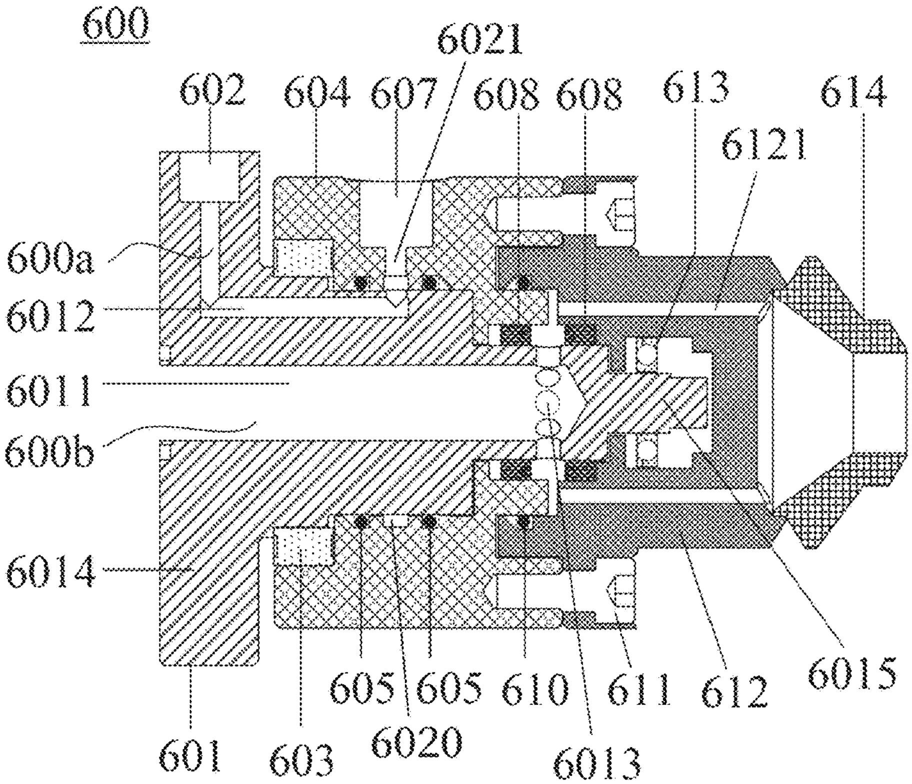
FIG. 8 shows a structure of a double-channel rotating joint in the high-pressure gas filling and unloading system according to the present invention.
Figure 9:
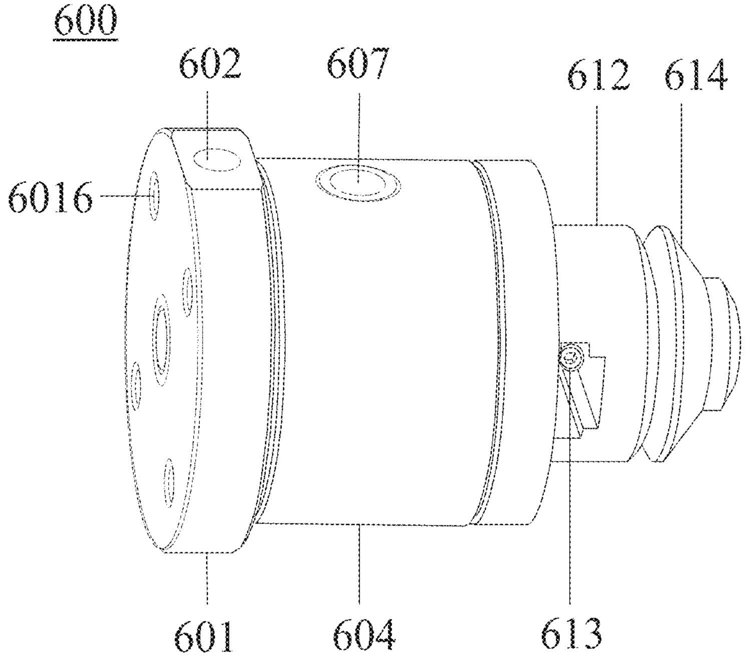
FIG. 9 schematically shows an external structure of the double-channel rotating joint as shown in FIG. 8.

FIGS. 8 and 9 show a structure of a double-channel rotating joint 600. As shown in FIGS. 8 and 9, the double-channel rotating joint 600 includes a rotating valve core 601, a valve core sleeve 604, a valve core seat 612 and a valve head 614. A center blind hole 6011 and a displacement gas flow hole 6012 extending along the axial direction are provided inside the rotating valve core 601. A first end (left end in FIG. 8) of the displacement gas flow hole 6012 is formed as a first displacement gas port 602. The valve core sleeve 604 is arranged around the rotating valve core 601 and is able to rotate relative to the rotating valve core 601. A sidewall of the valve core sleeve 604 is provided with a second displacement gas port 607, which is consistently in communication with a second end (right end in FIG. 1) of the displacement gas flow hole 6012. The valve core seat 612 is fixedly connected to the valve core sleeve 604, and a plurality of axial through holes 6121 evenly distributed in the circumferential direction is provided inside the valve core seat 612. Meanwhile, a plurality of radial through holes 6013 evenly distributed in the circumferential direction is provided on the rotating valve core 601, wherein both end of the radial through hole 6013 are in communication with the center blind hole 6011 and the axial through holes 6121, respectively. The valve head 614 is fixedly connected to the valve core sleeve 604, and an inner cavity of the valve head 614 is in communication with the axial through holes 6121. The first displacement gas port 602, the displacement gas flow hole 6012 and the second displacement gas port 607 are sequentially in communication to form a displacement gas flow path 600*a*. The center blind hole 6011, the radial through holes 6013, the axial through holes 6121 and the inner cavity of the valve head 614 are sequentially in communication to form a high-pressure gas flow path 600*b*.

As shown in FIG. 8, a first end of the rotating valve core 601 is provided with a disk-shaped base 6014. The displacement gas flow hole 6012 comprises a first duct and a second duct in communication with the first duct, wherein the first duct extends along a radial direction of the disk-shaped base 6014, and the second duct extends along an axial direction of the rotating valve core 601. The first displacement gas port 602 is formed at an end of the first duct.

In this embodiment, as shown in FIG. 9, the disk-shaped base 6014 is provided with a plurality of threaded mounting holes 6016 evenly distributed along the circumference direction for mounting fasteners. In this manner, the disk-shaped base 6014 has a flange connection structure for connecting to other pipelines, such as a high-pressure gas pipeline (see below). In order to ensure the sealing between the disk-shaped base 6014 and other pipelines, a sealing groove may be provided on an end surface of the disk-shaped base 6014 and at a position radially outer of the center blind hole 6011, wherein a sealing member may be installed within the sealing groove.

According to an embodiment of the present invention, an annular groove 6020 is provided on an inner wall surface of the valve core sleeve 604, at a position radially inner of the second displacement gas port 607. A communication aperture (i.e., a side-wall through hole) 6021 extending through a side wall of the valve core sleeve 604 is provided at a bottom of the second displacement gas port 607. The second displacement gas port 607 is in communication with the annular groove 6020 through the communication aperture 6021, and an end of the second duct is in communication with the annular groove 6020. Thus, the second displacement gas port 607 is in communication with the displacement gas flow hole 6012. When the valve core sleeve 604 rotates relative to the rotating valve core 601, the second displacement gas port 607 always remains in communication with the displacement gas flow hole 6012 through the annular groove.

As shown in FIG. 8, first sealing grooves spaced apart from each other are provided on the inner wall of the valve core sleeve 604, and are arranged on both axial sides of the annular groove, respectively. A first sealing member 605 is installed in each of the first sealing grooves. Preferably, the first sealing grooves are trapezoidal grooves, and the first sealing members are O-ring seals. At least two first sealing grooves may be provided. After the valve core sleeve 604 and the rotating valve core 601 are assembled, each O-ring seal 605 is pressed to form a seal, thereby ensuring the sealing performance of the displacement gas flow hole 6012, and that the displacement gas can only flow in the displacement gas flow hole 6012 between the first displacement gas port 602 and the second displacement gas port 607, and in the gas-phase space formed in the annular groove, which avoid leakage and diffusion of the displacement gas.

According to the present invention, a first outer step is provided on an outer wall of the rotating valve core 601 with an end surface toward the second end, and a first inner step is provided on an inner wall of the valve core sleeve 604 with an end surface toward the first end. A bearing 603 is installed between the first outer step and the first inner step. The valve core sleeve 604, which has a tubular structure, is arranged around an outer circumferential surface of the rotating valve core 601 as a whole. A rotational connection is formed between a first end of the valve core sleeve 604 and the rotating valve core 601 via the bearing 603, thereby realizing a smoother rotation between the valve core sleeve 604 and the rotating valve core 601.

As shown in FIG. 8, a protrusion 6015 extending in the axial direction is provided at a second end of the rotating valve core 601. Meanwhile, a hollow cavity is formed in the middle of the valve core seat 612, and a plurality of axial through holes 6121 in the valve core seat 612 is provided radially outer of the hollow cavity. A plane bearing 613 is installed in the hollow cavity, and the protrusion 6015 at the end of the rotating valve core 601 is inserted into the hollow cavity after passing through the plane bearing 613. An outer ring of the plane bearing 613 is fixedly connected to an inner wall of the hollow cavity, and an inner ring thereof is fixedly connected to the protrusion 6015, so that a rotational connection is formed between the rotating valve core 601 and the valve core seat 612 through the plane bearing 613. Thus, a smoother rotation between the valve core seat 612 and the rotating valve core 601 is realized.

According to an embodiment of the present invention, the valve core seat 612 and the valve core sleeve 604 are assembled as a mutually-embedded structure, and fastened together with a fastener 611, which is preferably a fastening bolt. An annular slot extending axially inward is provided at a second end of the valve core sleeve 604, and a tubular connection portion extending axially outward is provided at a first end of the valve core seat 612, wherein the tubular connection portion is engageably mounted in the annular slot. A second sealing groove is provided on an inner wall of the tubular connection portion, and a second sealing member 610 is mounted in the second sealing groove. Preferably, the second sealing groove is a trapezoidal groove, and the second sealing member is an O-ring seal. The valve core sleeve 604 and the valve core seat 612 form a fixed connection through the fastener 611, and fit the annular slot through the tubular connection portion to tightly press the second sealing member 610, thereby forming a seal between the valve core sleeve 604 and the valve core seat 612.

As shown in FIG. 8, a slot passage is formed between axial end surfaces of the valve core sleeve 604 and the valve core seat 612. The radial through holes 6013 of the rotating valve core 601 are in communication with the axial through holes 6121 of the valve core seat 612 through the slot passage. In this manner, a high-pressure gas flow path 600*b* consisting of the center blind hole 6011, the radial through holes 6013, the slot passage, the axial through holes 6121 and the inner cavity of the valve head 614 that are in communication with each other in sequence is formed within the double-channel rotating joints 600.

In one embodiment, a second inner step is also provided on the inner wall of the valve core sleeve 604 with an end surface toward the second end, and a third inner step is provided on the inner wall of the valve core seat 612 with an end surface toward the first end. After the double-channel rotating joints 600 are assembled, a first annular groove and a second annular groove are formed between the rotating valve core 601 and the second inner step, and between the rotating valve core 601 and the third inner step, respectively. The first annular groove and the second annular groove are arranged on both axial sides of the radial through holes 6013, respectively, and a third accumulator sealing ring 608 is installed inside each of the first annular groove and the second annular groove. Thus, the sealing between the rotating valve core 601 and the valve core sleeve 604 and that between the rotating valve core 601 and the valve core seat 612 are realized through corresponding third accumulator sealing rings 608, thereby ensuring the sealing performance of the high-pressure gas flow path 600*b* inside the double-channel rotating joints 600. Preferably, the third accumulator sealing ring 608 may be made of ultra-high molecular weight polyethylene, and thus has the self-lubricating properties.

Therefore, the rotating valve core 601 is rotationally connected to the valve core sleeve 604 under the action of the bearing 603, the protrusion 6015 and the plane bearing 613. The radial through holes 6013 retain the communication with the axial through holes 6121 of the valve core seat 612 through the channel between the third accumulator sealing rings 608. Thus, the rotating valve core 601 with the above structure is able to rotate smoothly relative to the valve core sleeve 604 when there is high-pressure gas within the double-channel high-pressure gas rotating joints 600, so that the double-channel high-pressure gas rotating joints 600 are able to rotate under pressure.

According to the present invention, as shown in FIG. 8, the valve head 614 includes a conical body and a tubular welded portion connected to a second end of the conical body. An inner diameter of the conical body is configured to decrease from a first end thereof to the second end thereof, thereby forming a conical cavity inside the valve head 614. A step-shaped connection portion is provided at a first end of the valve head 614 and has external threads. Meanwhile, internal threads are provided on an inner wall of a second end of the valve core seat 612, so that the valve head 614 and the valve core seat 612 are engageably and fixedly connected to each other through threads. The valve head 614 is welded to the high-pressure gas pipeline through the tubular welded portion.

Figure 10:
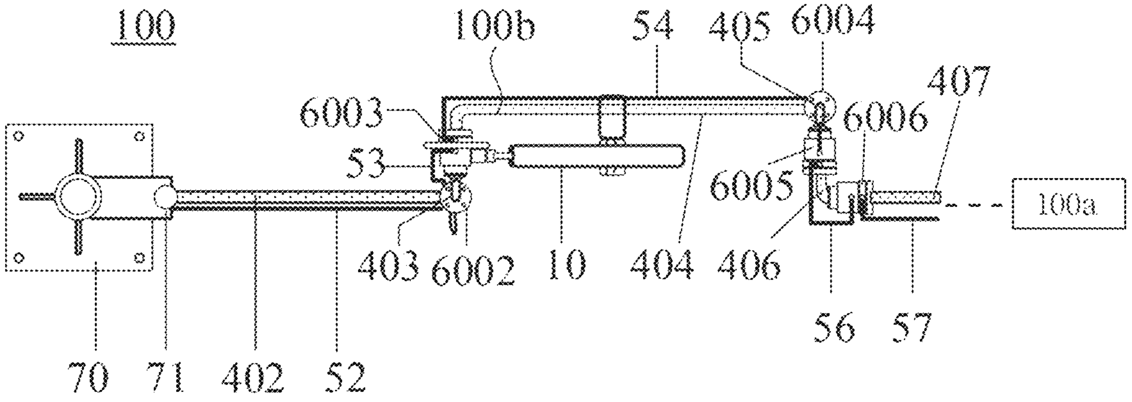
FIG. 10 is a top view of the high-pressure gas filling and unloading system as shown in FIG. 1.

According to the present invention, as shown in FIGS. 1 and 10, the filling and unloading arm 100*b* includes double-channel rotating joints 600, a high-pressure gas pipeline 400, a displacement gas pipeline 500, and a fixing column 70. The high-pressure gas pipeline 400 comprises a plurality of high-pressure gas sub-pipelines 401, 402, 403, 404, 405, 406 and 407, which are connected in sequence. Adjacent high-pressure gas sub-pipelines are rotationally connected to each other through one of the double-channel rotating joints 600, and these high-pressure gas sub-pipelines are in communication with the high-pressure gas flow path 600*b* within said one of the double-channel rotating joints 600. The displacement gas pipeline 500 comprises a plurality of displacement gas sub-pipelines 51, 52, 53, 54, 55, 56 and 57, each of which is in communication with the displacement gas flow path 600*a* within a corresponding double-channel rotating joint 600. The fixing column 70 is fixed on the site for high-pressure gas filling and unloading by means of foot bolts, and a first end of the high-pressure gas pipeline 400 is connected to the fixing column 70 through a support frame. The support frame includes an upper fixing plate and a lower fixing plate spaced apart and fixed on the fixing column 70. The first end of the high-pressure gas pipeline 400 is formed as a high-pressure gas port 73, and a first end of the displacement gas pipeline 500 is formed as a displacement gas port 72. The high-pressure gas pipeline 400 is capable of rotating under pressure through the double-channel rotating joints 600, so that the filling and unloading arm 100*b* can be extendable and rotatable, and the free end thereof can move three-dimensionally. The high-pressure gas pipeline 400 may be a rigid tube. One end of the high-pressure gas sub-pipeline is formed as a flange, through which the high-pressure gas sub-pipeline is engageably connected to the disk-shaped base 6014 at the first end of the double-channel rotating joint 600, thereby forming a fixed connection. The other end of the sub-high-pressure gas pipeline is fixedly connected to the tubular welded portion of the valve head 614 through welding.

The filling and unloading arm 100*b* further comprises a spring-loaded balancer 75 for maintaining poses of the high-pressure gas pipeline 400 and the double-channel rotating joints 600. As shown in FIG. 1, one end of the spring-loaded balancer 75 is mounted on a corresponding valve core sleeve 604 through clamping, while the other end thereof is mounted on a corresponding high-pressure gas pipeline.

As shown in FIGS. 1 and 10, the high-pressure gas pipeline 400 includes a first high-pressure gas sub-pipeline 401, a second high-pressure gas sub-pipeline 402, a third high-pressure gas sub-pipeline 403, a fourth high-pressure gas sub-pipeline 404, a fifth high-pressure gas sub-pipeline 405, a sixth high-pressure gas sub-pipeline 406 and a seventh high-pressure gas sub-pipeline 407 connected in sequence. Each high-pressure gas sub-pipeline is in communication with the high-pressure gas flow path 600*b* within a corresponding double-channel rotating joint 600, thereby forming a flow path for high-pressure gas. Two adjacent pipelines are connected to each other through a double-channel rotating joint 600. Thus, each double-channel rotating joint 600 is formed as a universal double-channel rotating joint, and also as a corresponding joint of the filling and unloading arm 100*b*. The displacement gas pipeline 500 includes a first displacement gas sub-pipeline 51, a second displacement gas sub-pipeline 52, a third displacement gas sub-pipeline 53, a fourth displacement gas sub-pipeline 54, a fifth displacement gas sub-pipeline 55, a sixth displacement gas sub-pipeline 56, and a seventh displacement gas sub-pipeline 57 connected in sequence. Each displacement gas sub-pipeline is in communication with the displacement gas flow path 600*a* in a corresponding double-channel rotating joint 600, thereby forming a flow path for displacement gas. Thus, the filling and unloading arm 100*b* is formed as a double-channel filling and unloading arm, which enables a quick connection between the long-tube trailer and the filling and unloading pipeline, as well as the gas displacement before and after the filling and unloading of high-pressure gas, and the filling and unloading of high-pressure gas.

As shown in FIG. 1, the first high-pressure gas sub-pipeline 401 is connected to the second high-pressure gas sub-pipeline 402 through a first universal double-channel rotating joint 6001. The first high-pressure gas sub-pipeline 401 is a straight pipeline, which is connected to the lower fixing plate after passing through a center hole therein. A lower end of the first high-pressure gas sub-pipeline 401 is formed as a high-pressure gas port 3 for connecting to the high-pressure gas pipeline in the filling and unloading pipeline. An upper end of the first high-pressure gas sub-pipeline 401 is connected to the valve head 614 of the first universal double-channel rotating joint 6001 through welding. Meanwhile, an upper end of the first displacement gas sub-pipeline 51 is connected to the second displacement gas port 607 of the first universal double-channel rotating joint 6001 through threads, and a lower end of the first displacement gas sub-pipeline 51 is provided with a displacement gas port 2 connected to the displacement pipeline in the filling and unloading pipeline.

As shown in FIG. 1, the second high-pressure gas sub-pipeline 402 is a Z-shaped pipeline, a lower end of which is fixedly connected to the disk-shaped base 6014 of the first universal double-channel rotating joint 6001 through a flange. A fixing tube is provided at an upper vertical end of the second high-pressure gas sub-pipeline 402, and a damping bearing 71 is provided in the upper fixing plate mounted on the fixing column 1. The fixing tube at the upper vertical end of the second high-pressure gas sub-pipeline 402 is inserted into the damping bearing 71, so that the second high-pressure gas sub-pipeline 402 can be rotatable horizontally with the Z-type vertical pipeline as an axis. In one embodiment, an inclined bracket 72 is provided in the middle of the second high-pressure gas sub-pipeline 402, and provides a support for the second high-pressure gas sub-pipeline 402. The second displacement gas sub-pipeline 52 is fixed along the inclined bracket 72.

As shown in FIGS. 1 and 10, the second high-pressure gas sub-pipeline 402 is connected to the third high-pressure gas sub-pipeline 403 through the second universal double-channel rotating joint 6002, and an upper end of the second high-pressure gas sub-pipeline 402 is welded to the valve head 614 of the second universal double-channel rotating joint 6002. The third high-pressure gas sub-pipeline 403 is a right-angle bending pipeline, and has a lower end fixedly connected to the disk-shaped base 6014 of the second universal double-channel rotating joint 6002 through a flange. Meanwhile, a lower end of the second displacement gas sub-pipeline 52 is connected to the first displacement gas port 602 of the first universal double-channel rotating joint 6001 through threads, and an upper end of the second displacement gas sub-pipeline 52 is connected to the second displacement gas port 607 of the second universal double-channel rotating joint 6002 through threads.

As shown in FIG. 10, the third high-pressure gas sub-pipeline 403 is connected to the fourth high-pressure gas sub-pipeline 404 through a third universal double-channel rotating joint 6003, and an upper end of the third high-pressure gas sub-pipeline 403 is welded to the valve head 614 of the third universal double-channel rotating joint 6003. The fourth high-pressure gas sub-pipeline 404 is a special Z-shaped pipeline, and has a horizontal left end fixedly connected to the disk-shaped base 6014 of the third universal double-channel rotating joint 6003 through a flange. In order to maintain the poses of the right-side pipeline of the fourth high-pressure gas sub-pipeline 404 and the third universal double-channel rotating joint 6003, one end of the spring-loaded balancer 10 is mounted on the third universal double-channel rotating joint 6003 through clamping, and the other end thereof is mounted on the fourth high-pressure gas sub-pipeline 404. Meanwhile, one end of the third displacement gas sub-pipeline 53 is connected to the first displacement gas port 602 of the second universal double-channel rotating joint 6002 through threads, and the other end thereof is connected to the second displacement gas port 607 of the third universal double-channel rotating joint 6003 through threads.

The fourth high-pressure gas sub-pipeline 404 is connected to the fifth high-pressure gas sub-pipeline 405 through a fourth universal double-channel rotating joint 6004. A vertical right end of the fourth high-pressure gas sub-pipeline 404 is welded to the valve head 614 of the fourth universal double-channel rotating joint 6004. The fifth high-pressure gas sub-pipeline 405 is a right-angle bending pipeline, and has a lower end fixedly connected to the disk-shaped base 6014 of the fourth universal double-channel rotating joint 6004 through a flange. One end of the fourth displacement gas sub-pipeline 54 is connected to the first displacement gas port 602 of the third universal double-channel rotating joint 6003 through threads, and the other end thereof is connected to the second displacement gas port 607 of the fourth universal double-channel rotating joint 6004 through threads.

Figure 11:
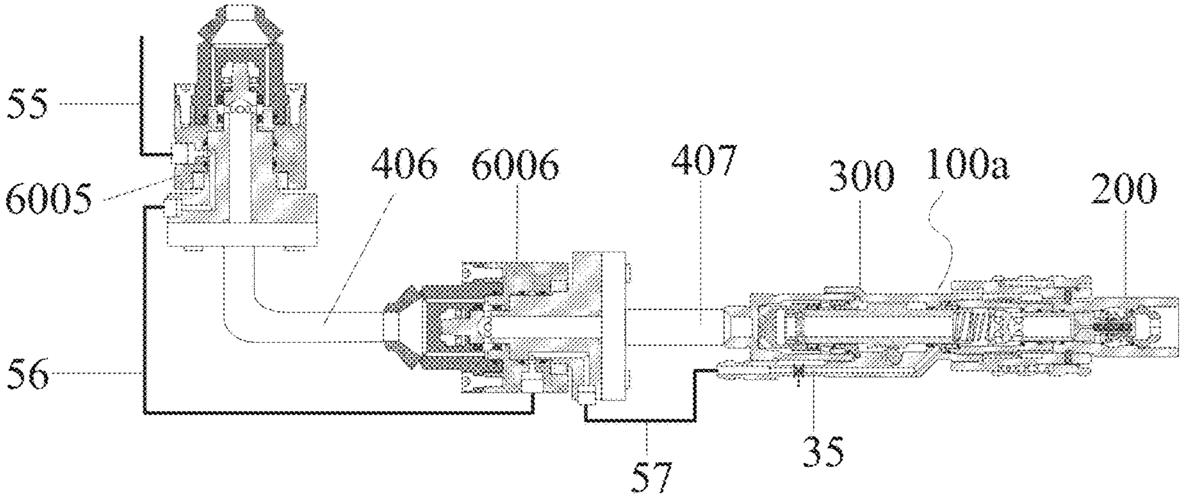
FIG. 11 schematically shows a connection between a filling and unloading arm and the filling and unloading joint in the high-pressure gas filling and unloading system.

As shown in FIGS. 10 and 11, the fifth high-pressure gas sub-pipeline 405 is connected to the sixth high-pressure gas sub-pipeline 406 through a fifth universal double-channel rotating joint 6005, and has an upper end welded to the valve head 614 of the fifth universal double-channel rotating joint 6005. The sixth high-pressure gas sub-pipeline 406 is a right-angle bending pipeline, and has a left end fixedly connected to the disk-shaped base 6014 of the fifth universal double-channel rotating joint 6005 through a flange. One end of the fifth displacement gas sub-pipeline 55 is connected to the first displacement gas port 602 of the fourth universal double-channel rotating joint 6004 through threads, and the other end thereof is connected to the second displacement gas port 607 of the fifth universal double-channel rotating joint 6005 through threads.

As shown in FIG. 11, the sixth high-pressure gas sub-pipeline 406 is connected to the seventh high-pressure gas sub-pipeline 407 through a sixth universal double-channel rotating joint 6006. The seventh high-pressure gas sub-pipeline 407 is a straight pipeline, with a left end thereof fixedly connected to the disk-shaped base 6014 of the sixth universal double-channel rotating joint 6006 through a flange, and a right end thereof connected to the female end unit 300 of the filling and unloading joint 100*a* through threads. An upper right end of the sixth high-pressure gas sub-pipeline 406 is welded to the valve head 614 of the sixth universal double-channel rotating joint 6006. Thus, each high-pressure gas sub-pipeline is in communication with the high-pressure gas flow path 600*b* within a corresponding universal double-channel rotating joint. One end of the sixth displacement gas sub-pipeline 56 is connected to the first displacement gas port 602 of the fifth universal double-channel rotating joint 6005 through threads, and the other end thereof is connected to the second displacement gas port 607 of the sixth universal double-channel rotating joint 6006 through threads. Meanwhile, one end of the seventh displacement gas sub-pipeline 57 is connected to the first displacement gas port 602 of the sixth universal double-channel rotating joint 6006 through threads, and the other end thereof is connected to the displacement gas valve port 35 of the filling and unloading joint 100*a* through threads.

The double-channel rotating joint 600 used in the high-pressure gas filling and unloading system 100 according to the present invention comprises a high-pressure gas flow path 600*b* and a displacement gas flow path 600*a*. Due to the multiple sealing structures of the high-pressure gas filling and unloading system 100, the rotating valve core 601 can still rotate smoothly between the valve core sleeve 604 and the valve core seat 612 even when high-pressure gas exists, thus effectively ensuring the safe discharge of the displacement gas before and after the filling and unloading of high-pressure gas, and the safety of pipelines during the filling and unloading of high-pressure gas. With the combination of the high-pressure gas pipeline 400 and the displacement gas pipeline 500 with the plurality of double-channel rotating joints 600, the high-pressure gas filling and unloading arm 100*b* according to the present invention forms the high-pressure gas flow pipeline and the displacement-gas flow path, and realizes the hard-pipeline connection between the filling and unloading pipeline and the high-pressure gas tube bundle vehicle, thus ensuring the safety of the filling and unloading of high-pressure gas. With the cooperation between the high-pressure gas filling and unloading arm 100*b* and the filling and unloading joint 100*a*, the high-pressure gas filling and unloading system 100 according to the present invention, by rotating the handle 50 of the filling and unloading joint 100*a*, is able to realize the displacement of air within the female end unit 300 before the filling and unloading of high-pressure gas, and the displacement of high-pressure gas within the female end unit 300 after the filling and unloading. The displacement gas is discharged overhead through the displacement gas pipeline 500 of the high-pressure gas filling and unloading arm 100*b*, which greatly reduces the amount and the risk of high-pressure gas displacement.

It should be understood that in the present invention, the terms "first" and "second" are used for illustrative purposes only, and are not intended to indicate or imply relative importance or implicitly specify the number of technical features indicated. Thus, the technical features defined with the terms "first" or "second" may explicitly or implicitly include one or more such technical features. In the description of the present invention, "a plurality of" means two or more, unless otherwise specified. It is also to be noted that the terms or determiners indicating directions "upper", "lower", "left", "right", etc. in the present application are all directed to the corresponding drawings, and are used for illustrative purposes of the present invention and simplified illustration only, which are not intended to limit the absolute positions of the components involved, but may be varied according to specific circumstances.

Finally, it should note that the foregoing description is merely illustrative of preferred embodiments of the present invention, and is not intended to restrict the present invention. Although the present invention is described in detail with reference to the above embodiments, it is still possible for one skilled in the art to modify the technical solutions defined in the above embodiments or to replace some of the technical features with equivalent ones. Any modifications, equivalent substitutions, improvements, and the like falling within the spirit and principles of the present invention are intended to be included within the scope of protection of the present invention.

The invention claimed is:

1. A high-pressure gas filling and unloading system, comprising:

a high-pressure gas pipeline for connecting to a gas filling station;

a displacement gas pipeline for gas displacement;

a plurality of double-channel rotating joints provided in said high-pressure gas pipeline and configured to be rotatable under pressure; and a filling and unloading joint provided at a free end of said high-pressure gas pipeline and comprising a control mechanism, said filling and unloading joint being configured to form a displacement working channel or a filling and unloading working channel therein through the control mechanism, wherein the control mechanism is configured to alternately open the displacement working channel and the filling and unloading working channel, so that the displacement working channel is in communication with the displacement gas pipeline for gas displacement, or the filling and unloading working channel is in communication with the high-pressure gas pipeline for filling and unloading of high-pressure gas, wherein the filling and unloading joint further comprises a male end unit for connection with a high-pressure gas transportation vehicle or a gas-fueled device, and a female end unit for fixed connection with the high-pressure gas pipeline, the control mechanism being arranged on the female end unit, wherein the female end unit comprises a female housing, a valve core assembly within the female housing, and a bypass displacement pipeline formed within the female housing, and wherein an inner cavity of the female end unit is configured to be in communication with the bypass displacement pipeline to form a female displacement flow path, and the valve core assembly is configured to move, driven by the control mechanism, axially relative to the female housing, thereby closing the female displacement flow path and forming a female filling and unloading flow path within the female end unit.

2. The high-pressure gas filling and unloading system according to claim 1, wherein the control mechanism is configured to drive the valve core assembly to move axially, so that a male pilot flow path in the male end unit and the female displacement flow path are alternately in communication with the inner cavity of the female end unit for gas displacement, and the female filling and unloading flow path is in communication with a male filling and unloading flow path in the male end unit to open the filling and unloading working channel for filling and unloading of high-pressure gas.

3. The high-pressure gas filling and unloading system according to claim 2, wherein the control mechanism comprises a handle gear provided on the female housing and a transmission gear which engages the handle gear, the transmission gear being formed on an outer peripheral surface of the valve core assembly, and the valve core assembly being driven to move axially relative to the female housing by rotating the handle gear, and wherein the handle gear has three control positions, so that the female displacement flow path is alternately opened and closed by alternately rotating the handle gear to a first position and a second position, thereby enabling gas displacement through the female displacement flow path, and the filling and unloading working channel is opened for the filling or unloading of high-pressure gas when the handle gear is in a third position.

4. The high-pressure gas filling and unloading system according to claim 3, wherein the female housing includes a female gun base having a connection end, as well as a gun body and a gun sleeve affixed to a front end of the female gun base in sequence, the bypass displacement pipeline being arranged within the gun body, and the valve core assembly includes an outlet valve core and a main valve core, wherein the outlet valve core is installed within the gun sleeve through an outlet valve core sleeve, and the main valve core is installed on the female gun base through a main valve core base and actuated by the handle gear.

5. The high-pressure gas filling and unloading system according to claim 4, wherein the outlet valve core comprises a hollow tube body and a solid umbrella member provided at one end of the hollow tube body, a first sloping through hole and a second sloping through hole being provided on both axial sides of the solid umbrella member, respectively, and the first sloping through hole and the second sloping through hole are configured to be sealed from each other to form a self-sealing state of the female end unit and thus seal the outlet valve core from the main valve core, or be in communication with each other in order to connect the outlet valve core and the main valve core.

6. The high-pressure gas filling and unloading system according to claim 5, wherein a third resilient member is provided between the outlet valve core and the main valve core, and the solid umbrella member is configured to, under an action of the third resilient member, abut against a sloping surface formed within the outlet valve core sleeve to form a seal, or is disengaged therefrom, so that the first sloping through hole and the second sloping through hole are sealed from or in communication with each other.

7. The high-pressure gas filling and unloading system according to claim 4, wherein a third annular space is formed between the main valve core base and the female gun base, and is in communication with the connection end of the female gun base, and when the handle gear is in the third position, the main valve core is in communication with the third annular space, thereby opening the female filling and unloading flow path.

8. The high-pressure gas filling and unloading system according to claim 7, wherein the main valve core base has a cylindrical structure with a closed end where sloping through holes in communication with the connection end of the female gun base are provided, and switch holes are provided on a side wall of the main valve core base, wherein the sloping through holes are in communication with the switch holes through the third annular space.

9. The high-pressure gas filling and unloading system according to claim 8, wherein third through holes are distributed on a side wall of the main valve core, and the third through holes are configured to be offset from or align with the switch holes through an axial movement of the main valve core relative to the female housing, thereby closing or opening the female filling and unloading flow path.

10. The high-pressure gas filling and unloading system according to claim 9, wherein fourth through holes are further provided on the side wall of the main valve core, and a second accumulator sealing ring is provided between the main valve core and the outlet valve core sleeve, and wherein the fourth through holes, due to the axial movement of the main valve core, are on an axially inner side of the second accumulator sealing ring to open the female displacement flow path, or on an axially outer side thereof to close the female displacement flow path.

11. The high-pressure gas filling and unloading system according to claim 3, wherein the male end unit includes a male gun base, a diverter valve fixedly mounted within the male gun base, and a pilot valve adaptively cooperating with the diverter valve, an axial end surface of the pilot valve closely fitting an axial end surface of the valve core assembly when the male end unit is connected to the female end unit, and the pilot valve is configured to form the male pilot flow path in the male end unit when the handle gear is in the second position, and to form the male filling and unloading flow path in the male end unit when the handle gear is in the third position.

12. The high-pressure gas filling and unloading system according to claim 11, wherein the pilot valve comprises a pilot valve seat and a pilot valve core adaptively cooperating with the pilot valve seat, a first annular space in communication with the diverter valve being formed between the pilot valve seat and the male gun base, and a second annular space-being formed between the pilot valve core and the male gun base;

when the handle gear is in the first position and the second position, the first annular space and the second annular space are sealed off from each other, thereby closing the male filling and unloading flow path; and when the handle gear is in the third position, the first annular space is in communication with the second annular space, thereby opening the male filling and unloading flow path.

13. The high-pressure gas filling and unloading system according to claim 12, wherein the pilot valve core comprises a hollow tube inserted into the pilot valve seat and a valve head connected to one end of the hollow tube, and the valve head is provided with a center through hole in communication with the hollow tube and a plurality of sloping holes extending through the valve head and evenly distributed in a circumferential direction, the sloping holes being in communication with the second annular space.

14. The high-pressure gas filling and unloading system according to claim 13, wherein a plurality of first through holes is evenly distributed in a circumferential direction on the hollow tube, and a plurality of second through holes is evenly distributed in a circumferential direction on the pilot valve seat, wherein when the handle gear is in the first position and the third position, the first through holes are offset from the second through holes to close the male pilot flow path; and when the handle gear is in the second position, the first through holes are in communication with the second through holes to open the male pilot flow path.

15. The high-pressure gas filling and unloading system according to claim 1, wherein a displacement gas flow path in communication with the displacement gas pipeline and a high-pressure gas flow path in communication with the high-pressure gas pipeline are provided within the double-channel rotating joint.

16. The high-pressure gas filling and unloading system according to claim 15, wherein the double-channel rotating joint comprises:

a rotating valve core, in which a center blind hole and a displacement gas flow hole extending along an axial direction are provided; and a valve core sleeve arranged around the rotating valve core, and comprising a port extending through a side wall thereof, wherein the valve core sleeve is configured to rotate relative to the rotating valve core, so that the displacement gas flow hole is always in communication with the port, thereby forming the displacement gas flow path.

17. The high-pressure gas filling and unloading system according to claim 16, wherein the port comprises a side-wall through hole and an annular groove formed on an inner wall of the valve core sleeve, wherein the annular groove is in communication with the side-wall through hole, and the displacement gas flow hole is in communication with the annular groove, so that the port remains in communication with the displacement gas flow hole.

18. The high-pressure gas filling and unloading system according to claim 16, wherein the double-channel rotating joint further comprises:

a valve core seat fixedly connected to the valve core sleeve, and a plurality of axial through holes evenly distributed in a circumferential direction inside the valve core seat; and a valve head-fixedly connected to the valve core seat, wherein a center blind hole extending along an axial direction and a plurality of radial through holes evenly distributed in a circumferential direction are provided within the rotating valve core, the center blind hole, the radial through holes, the axial through holes and an inner cavity of the valve head being sequentially in communication to form the high-pressure gas flow path.

* * * * *